United States Patent
Lee et al.

(10) Patent No.: US 9,595,298 B2
(45) Date of Patent: Mar. 14, 2017

(54) TRANSFORMING DATA TO CREATE LAYOUTS

(75) Inventors: David Benjamin Lee, Sammamish, WA (US); Nathan George Freier, Seattle, WA (US); Ilya Tumanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 13/552,416

(22) Filed: Jul. 18, 2012

(65) Prior Publication Data

US 2014/0026038 A1 Jan. 23, 2014

(51) Int. Cl.
G06F 17/00 (2006.01)
G11B 27/28 (2006.01)
G11B 27/34 (2006.01)

(52) U.S. Cl.
CPC ............. *G11B 27/28* (2013.01); *G11B 27/34* (2013.01)

(58) Field of Classification Search
CPC ...................................................... G06T 11/60
See application file for complete search history.

(56) References Cited

U.S. PATENT DOCUMENTS

| | | | |
|---|---|---|---|
| 6,392,671 B1 | 5/2002 | Glaser | |
| 6,775,675 B1 | 8/2004 | Nwabueze et al. | |
| 7,274,832 B2 | 9/2007 | Nicponski | |
| 7,698,340 B2 | 4/2010 | Ye et al. | |
| 7,912,246 B1 | 3/2011 | Moon et al. | |
| 8,539,344 B2 | 9/2013 | Hull et al. | |
| 8,990,140 B2 | 3/2015 | Michelstein et al. | |
| 2002/0054174 A1 | 5/2002 | Abbott et al. | |
| 2003/0174869 A1* | 9/2003 | Suarez | G06T 11/60 382/118 |

(Continued)

FOREIGN PATENT DOCUMENTS

| | | |
|---|---|---|
| CN | CN102360368 A | 2/2012 |
| CN | 102663010 | 9/2012 |

(Continued)

OTHER PUBLICATIONS

Office action for U.S. Appl. No. 13/552,662, mailed on Nov. 6, 2014, Michelstein et al, "Creating Variations When Transforming Data Into Consumable Content", 5 pages.

(Continued)

*Primary Examiner* — Keith Bloomquist
(74) *Attorney, Agent, or Firm* — Dave Ream; Tom Wong; Micky Minhas

(57) ABSTRACT

Concepts and technologies are described herein for transforming data to create layouts. In accordance with the concepts and technologies disclosed herein, a computing device can execute a layout generator. The computing device can be configured to receive or retrieve data that includes visual content such as an image and other content such as text. The computing device can analyze the visual content to identify a salient region and/or an invariant region within the visual content. The computing device can access designs for laying out visual content and other content based upon an identified salient region and/or invariant region. The computing device can evaluate the designs to determine if a design matches the data. The computing device can load the data into the selected design to generate the layout.

20 Claims, 13 Drawing Sheets

(56) References Cited

U.S. PATENT DOCUMENTS

| | | | |
|---|---|---|---|
| 2003/0202105 A1* | 10/2003 | Gaubatz | G06K 9/0061 348/207.99 |
| 2004/0130566 A1 | 7/2004 | Banerjee et al. | |
| 2005/0089196 A1* | 4/2005 | Gu | G06F 3/0317 382/107 |
| 2005/0097463 A1* | 5/2005 | Yu | 715/531 |
| 2005/0180595 A1* | 8/2005 | Horii | G06K 9/00664 382/100 |
| 2006/0048042 A1 | 3/2006 | Sembower et al. | |
| 2006/0150088 A1 | 7/2006 | Kraft et al. | |
| 2007/0064278 A1 | 3/2007 | Sugimoto | |
| 2007/0070408 A1 | 3/2007 | Ono et al. | |
| 2007/0101251 A1* | 5/2007 | Lee et al. | 715/501.1 |
| 2007/0189615 A1* | 8/2007 | Liu | G06K 9/38 382/232 |
| 2007/0225996 A1 | 9/2007 | Haberman et al. | |
| 2008/0007785 A1* | 1/2008 | Hashii | H04N 1/4072 358/3.01 |
| 2008/0092057 A1 | 4/2008 | Monson et al. | |
| 2008/0205712 A1 | 8/2008 | Ionita et al. | |
| 2008/0245211 A1 | 10/2008 | Lemons | |
| 2008/0292207 A1* | 11/2008 | Kang | G06T 5/008 382/274 |
| 2009/0079764 A1* | 3/2009 | Lin | G06T 3/0031 345/660 |
| 2009/0278937 A1 | 11/2009 | Botchen et al. | |
| 2009/0319555 A1 | 12/2009 | Ragno et al. | |
| 2009/0324068 A1* | 12/2009 | Yamakawa | H04N 1/40 382/165 |
| 2010/0036828 A1 | 2/2010 | Carmel et al. | |
| 2010/0037273 A1 | 2/2010 | Dressel et al. | |
| 2010/0088605 A1 | 4/2010 | Livshin et al. | |
| 2011/0055722 A1 | 3/2011 | Ludwig et al. | |
| 2011/0069085 A1* | 3/2011 | Weber | G06T 11/60 345/620 |
| 2011/0158510 A1 | 6/2011 | Aguilar et al. | |
| 2011/0169835 A1 | 7/2011 | Cardno et al. | |
| 2012/0053986 A1 | 3/2012 | Cardno et al. | |
| 2012/0095863 A1 | 4/2012 | Schiff | |
| 2012/0278704 A1* | 11/2012 | Ying et al. | 715/243 |
| 2013/0021346 A1 | 1/2013 | Terman | |
| 2013/0129233 A1* | 5/2013 | Schiller | G06T 11/60 382/228 |
| 2013/0273968 A1 | 10/2013 | Rhoads et al. | |
| 2013/0311877 A1 | 11/2013 | Ebner | |
| 2013/0332475 A1 | 12/2013 | Michelstein et al. | |
| 2014/0025619 A1 | 1/2014 | Michelstein et al. | |
| 2014/0025650 A1 | 1/2014 | Lee et al. | |
| 2014/0129969 A1 | 5/2014 | Chasman et al. | |
| 2014/0337723 A1* | 11/2014 | Van Tol | G06T 11/001 715/275 |
| 2015/0055871 A1 | 2/2015 | Muthuswamy | |
| 2015/0178376 A1 | 6/2015 | Michelstein et al. | |
| 2015/0199605 A1 | 7/2015 | Michelstein et al. | |
| 2015/0317406 A1 | 11/2015 | Bort | |
| 2016/0085786 A1 | 3/2016 | Michelstein Halberstam et al. | |

FOREIGN PATENT DOCUMENTS

| | | |
|---|---|---|
| CN | 104350493 | 2/2015 |
| EP | 1 220 531 | 7/2002 |
| EP | 1630703 | 3/2006 |
| WO | WO 2007/021556 | 2/2007 |

OTHER PUBLICATIONS

US Notice of Allowance dated Nov. 18, 2014, in U.S. Appl. No. 13/491,612.
Office Action for U.S. Appl. No. 13/551,638, mailed on Nov. 6, 2014, Lee et al, "Abstract Relational Model for Transforming Data Into Consumable Content", 22 pages.
Office action for U.S. Appl. No. 13/551,638, mailed on Apr. 9, 2015, Lee et al., "Abstract Relational Model for Transforming Data Into Consumable Content", 26 pages.
"Present" | Define Present at Dictionary.com, retrieved on Apr. 3, 2015 at <<http://dictionary.reference.com/browse/present?s=t>>, Dictionary.com, 2015, 9 pages.
"Suggest" | Define Suggest at Dictionary.com, retrieved on Apr. 3, 2015 at <<http://dictionary.reference.com/browse/suggest?s=t>>, Dictionary.com, 2015, 5 pages.
Office action for U.S. Appl. No. 14/640,446, mailed on May 7, 2015, Michelstein et al., "Transforming Data into Consumable Content", 5 pages.
Office action for U.S. Appl. No. 14/670,476 mailed on Sep. 15, 2015, Michaelstein et al., "Creating Variations when Transforming Data into Consumable Content", 7 pages.
Feng, et al., "Salient object detection by composition" Retrieved at: <URL: http://research.microsoft.com/en-us/people/yichenw/iccv11_salientobjectdetection.pdf>, IEEE International Conference on Computer Vision (ICCV), 2011, 8 pgs.
El-Bakry, et al., "Face Detection Using Neural Networks and Image Decomposition", Retrieved at: <http://ieeexplore.ieee.org/stamp/stamp.jsp?tp=&arnumber=1005620>, Proceedings of the 2002 International Joint Conference: Neural Networks, 2002, May 12, 2002, pp. 1045-1050.
Yang, et al., "Detecting Faces in Images: A Survey", Retrieved at: <http://vision.ai.uiuc.edu/mhyang/papers/pami02a.pdf>, IEEE Transactions, Proceedings: Pattern Analysis and Machine Intelligence, Jan. 2002, pp. 34-58.
Mikolajczyk, et al., "A Performance Evaluation of Local Descriptors", Retrieved at: <http://research.microsoft.com/en-us/um/people/manik/projects/trade-off/papers/MikolajczykPAMI05.pdf>, IEEE Transactions, Proceedings: Pattern Analysis and Machine Intelligence, Oct. 2005, pp. 1615-1630.
Kuan, et al., "Color-Based Image Salient Region Segmentation Using Novel Region Merging Strategy", Retrieved at: <http://ieeexplore.ieee.org/stamp/stamp.jsp?tp=&arnumber=4543841>, IEEE Transactions, Proceedings: Multimedia, Aug. 2008, pp. 832-845.
U.S. Official Action dated Feb. 10, 2014 in U.S. Appl. No. 13/551,638.
International Search Report dated Jan. 29, 2104 in International Application No. PCT/US13/050961.
International Search Report dated Jan. 27, 2104 in International Application No. PCT/US13/050968.
Dobrikov et al., "The Architecture of a Corporate Information and News Engine," Jun. 19, 2013, *Proceedings of the 4th International Conference on Computer Systems and Technologies e-Learning*, 6 pp.
Huang et al., "Header Metadata Extraction from Semi-structured Documents Using Template Matching," 2006, *Lecture Notes in Science: On the Move to Meaningful Internet Systems*, vol. 4278, pp. 1776-1785.
Jovanovic et al., "Automating Semantic Annotation to Enable Learning Content Adaptation," 2006, *Adaptive Hypermedia and Adaptive Web-Based Systems Lecture Notes in Computer Science*, Springer, Berlin, Germany, pp. 151-160.
Jovanovic et al., "Ontology-based Automatic Annotation of Learning Content," Apr.-Jun. 2006, *International Journal on Semantic Web & Information Systems*, 2(2): 91-119.
Kaiser et al., "Information Extraction: A Survey," May 2005, Technical Report, Vienna University of Technology, 32 pp.
Witten et al., "Importing Documents and Metadata into Digital Libraries: Requirements Analysis and an Extensible Architecture," 2002, In *Research and Advanced Technology for Digital Libraries*, Springer, Berlin, vol. 2458, pp. 390-405.
"Feedback", dictionary.com, Captured Feb. 5, 2014, Available at: Http://dictionary.reference.com/browse/feedback, 3pp.
U.S. Official Action dated Oct. 28, 2013 in U.S. App. No. 13/551,638.
International Search Report dated Oct. 4, 2013 in International Application No. PCT/US13/042954.
International Search Report dated Nov. 12, 2013 in International Application No. PCT/US13/050964.

(56) References Cited

OTHER PUBLICATIONS

Abidi, "Intelligent Information Personalization: from issue to strategies," Published Sep. 30, 2008, In Panagiotis Germanakos (Eds) Intelligent User Interfaces: Adaptation and Personalization Systems and Technologies, 21 Pages.

Beale, "Supporting Serendipity: Using Ambient Intelligence to Augment User Exploration for Data Mining and Web Browsing", May 2007, Proceedings: International Journal of Human-Computer Studies, vol. 65(5): 421-433.

Blokzijl et al., "The Effect of Text Slides Compared to Visualizations on Learning and Appreciation in Lectures", Oct. 1-3, 2007, In *IEEE International Professional Communication Conference 2007, IPCC '07, IEEE International*, 9 pp.

Bucaro, "Configure Folder Options," Published on: Sep. 26, 2013, Bucaro TecHelp, Available at: http://bucarotechelp.com/computers/wintips/94052503.asp, 6 pp.

Choi et al., "Exploring Factors of Media Characteristic Influencing Flow in Learning through Virtual Worlds", Jan. 12, 2011, *Computers & Education*, pp. 2382-2394.

Esposito, "More Windows 2000 UI Goodies: Extending Explorer Views by Customizing Hypertext Template Files," Published on: Jun. 2000, Microsoft, Available at: http://msdn.microsoft.com/en-us/magazine/cc302292.aspx, 12pp.

Griebel "Repository Support for Visualization in Relational Databases," Sep. 1996, Available at:http://citeseerx.ist.psu.edu/viewdoc/download?doi=10.1.1.12.2225&rep=rep1&type=pdf , pp. 121.

Hinz et al., "Personalization-based optimization of web interfaces for mobile devices," 2004, *Field Programmable Logic and Applications*, vol. 3160, pp. 204-215.

Jackson, "Windows 2000 Root Kit Analysis: Attack of Nov. 1, 2003," Published on Sep. 26, 2013, gatech.edu, Available at: http://users.ece.gatech.edu/owen/Research/HoneyNet/Quarterly/Analysis_oCWindows_2000_root-kit.htm, 4 pp.

Kamba et al., "The Krakatoa chronicle an interactive, personalized, newspaper on the web," Dec. 1995, In Proceedings of the Fourth International World Wide Web Conference, 15 Pages.

Karlkapp, "Virtual Worlds and Compliance", Published on: Feb. 15, 2011, Available at: http://www.kaplaneduneering.com/kappnotes/index.php/2011/02/virtual-worlds-and-compliance/, 5 pp.

Linden, "This Project Viewer Lets Landowners Control Environment Settings", Published on: Jun. 13, 2011, Available at: http://community.secondlife.com/t5/Land/bg-p/landandbusiness, 3pp.

Mansmann et al., "Exploring OLAP Aggregates with Hierarchical Visualization Techniques", Mar. 11-15, 2007, *Proceedings: SAC '07, Proceedings of the 2007 ACM symposium on applied computing*, pp. 1067-1073.

Rowe et al., "Implementation and Evaluation of an Adaptive Multimedia Presentation System (AMPS) with Contextual Supplemental Support Media", Jun. 13-19, 2010, *Proceedings of MMEDIA '10, Proceedings of the 2010 Second International Conferences on Advances in Multimedia*, pp. 134-139.

Schrier et al., "Adaptive layout for dynamically aggregated documents," Jan. 13, 2008, *Proceedings of the 13 the International Conference on Intelligent User Interfaces IUI '08*, Maspalomas, Spain, 10 pp.

Stewart et al., "Software Environments for Scenario-based Learning", Published on: Aug. 20, 2009, Available at: http://akoaotearoa.ac.nz/download/ng/file/group-6/n3498-software-environments-for-scenario-based-learning-a-snapshot-comparison-of-some-available-tools.pdf, 24pp.

Stolte et al., "Multiscale Visualization Using Data Cubes," Apr. 2003, In *Proceedings: IEEE Transactions on Visualization and Computer Graphics*, 9(2):176-187.

Shultz, "Associating File types with Multiple Applications," Published on: Apr. 2001, Available at: msdn.microsoft.com/enus/library/ms977165.aspx, 5 pp.

Wichary, Mouse 2006 [Captured on Sep. 26, 2013], Guidebook Gallery, Available at: http://www.guidebookgallery.org/screenshots/mouse, 26 pp.

Wunsche, "A Survey, Classification and Analysis of Perceptual Concepts and their Application for the Effective Visualisation of Complex Information", Feb. 1, 2004, in Proceedings: APVis '04 Proceedings of the 2004 Australasian symposium on Information Visualisation, vol. 35, pp. 17-24.

"Captivate 4: Produce Interactive Simulations and Demonstrations", Published on: Dec. 27, 2011, Available at: http://cit.jmu.edu/useruploads/files/captivate4tutorial.pdf, 11 pp.

"Cognitive Informatics: Interactive e-Learning Approach", Published on: May 2008, Available at: http://www.pnl.gov/coginformatics/elearning_approach.stm, 2 pp.

"Flexible Authoring Solutions for Learning Professionals", Published on: Nov. 2007, Available at: http://www.adobe.com/resources/elearning/pdfs/flexible_authoring_solutions_wp.pdf, 4 pp.

"How to Configure Desktop Themes in Windows 2000" [Captured on Sep. 26, 2013], Microsoft, Available at: http://support.microsoft.com/kb/2578741, 2 pp.

"Maximum Volume Sizes," Published on: Sep. 26, 2013, Available at: Microsoft, http://technet.microsoft.com/en-us/library/cc938432.aspx, 3 pp.

"NTFS.com: Complete info source: NTFS & FAT file systems and data recovery" [Captured Sep. 26, 2013], NTFS.com, Available at: www.ntfs.com/ntfs.htm, 4 pp.

The Chinese Office Action mailed Apr. 13, 2016 for Chinese Patent Application No. 201380030239.7, a counterpart foreign application of U.S. Appl. No. 13/491,612.

Office action for U.S. Appl. No. 14/670,476, mailed on May 12, 2016, Michelstein et al., "Creating Variations when Transforming Data into Consumable Content", 9 pages.

U.S. Official Action dated Jul. 16, 2014 in U.S. Appl. No. 13/491,612.

U.S. Official Action dated Jul. 16, 2014 in U.S. Appl. No. 13/552,662.

U.S. Official Action dated Jun. 26, 2014 in U.S. Appl. No. 13/551,638.

The Chinese Office Action mailed Jul. 1, 2016 for Chinese Patent Application No. 2013800383619, a counterpart foreign application of U.S. Appl. No. 13/552,662, 22 pages.

The Chinese Office Action mailed Jul. 4, 2016 for Chinese Patent Application No. 2013800384522, a counterpart foreign application of U.S. Appl. No. 13/551,638, 19 pages.

The European Office Action mailed Jul. 22, 2016 for European patent application No. 13728612.6, a counterpart foreign application of U.S. Appl. No. 13/491,612, 8 pages.

The European Office Action mailed Jul. 22, 2016 for European Patent Application No. 13745236.3, a counterpart foreign application of U.S. Appl. No. 13/552,662, 9 pages.

The European Office Action mailed Jul. 25, 2016 for European patent application No. 13745925.1, a counterpart foreign application of U.S. Appl. No. 13/551,638, 9 pages.

Office action for U.S. Appl. No. 14/954,447, mailed on Jul. 14, 2016, Michaelstein et al., "Transforming Data into Consumable Content", 10 pages.

Office action for U.S. Appl. No. 13/551,638, mailed on Oct. 23, 2015, Lee et al., "Abstract Relational Model for Transforming Data Into Consumable Content ", 22 pages.

Office action for U.S. Appl. No. 14/670,476, mailed on Jan. 29, 2016, Michelstein et al., "Creating Variations when Transforming Data into Consumable Content", 7 Pages.

Office action for U.S. Appl. No. 14/954,447, mailed on Jan. 5, 2016, Michaelstein et al., "Transforming Data into Consumable Content", 5 pages.

\* cited by examiner

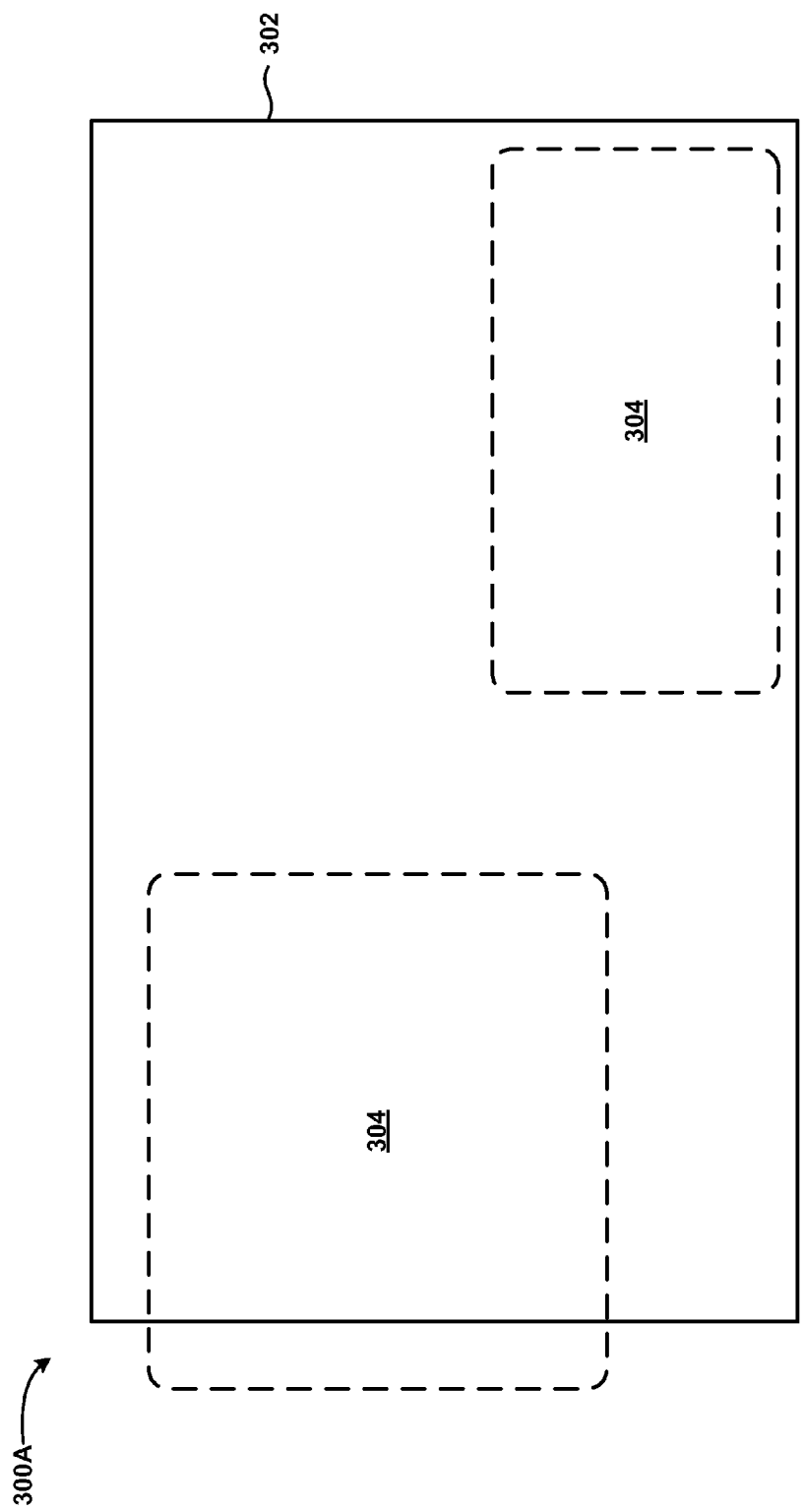

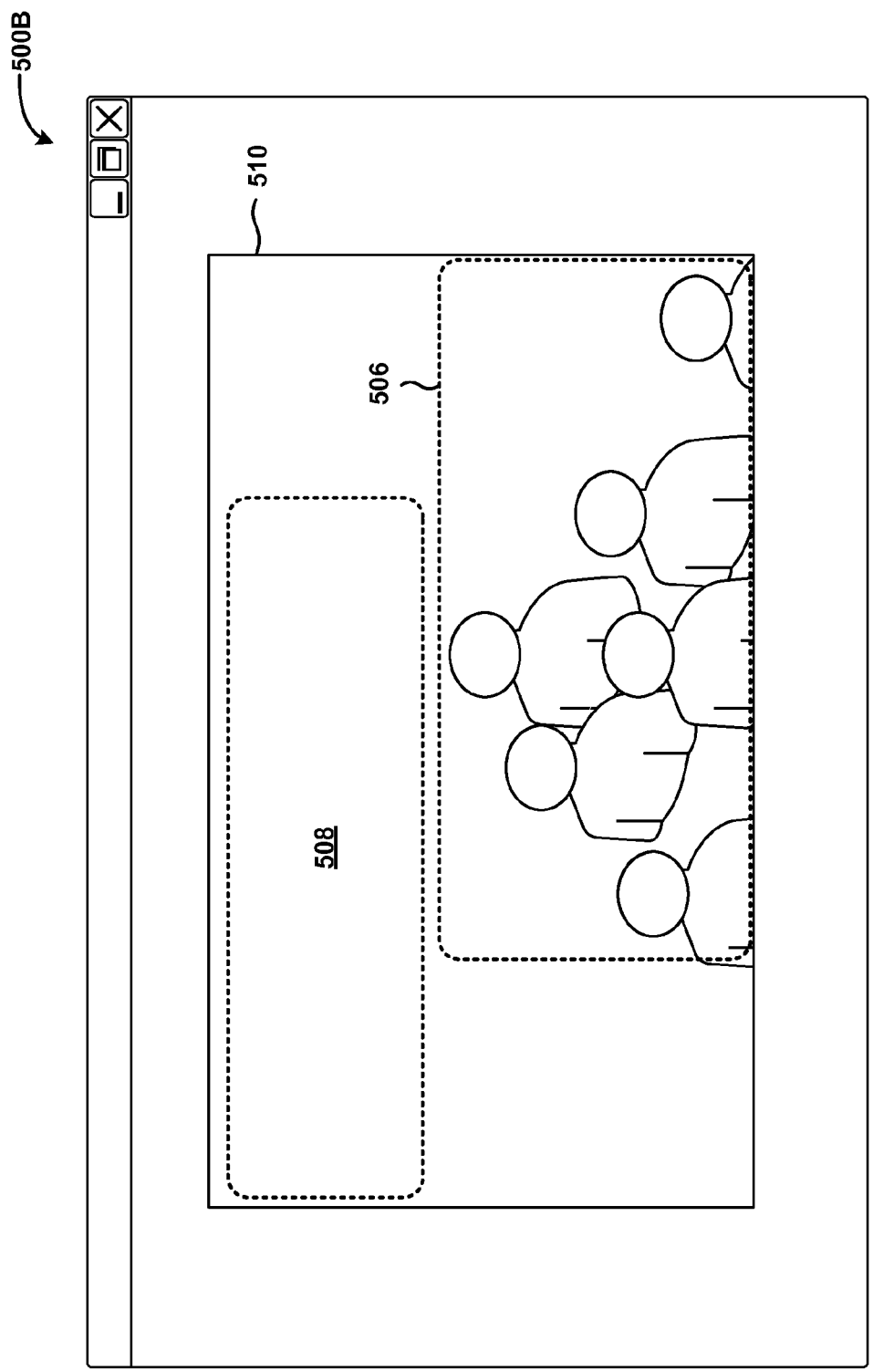

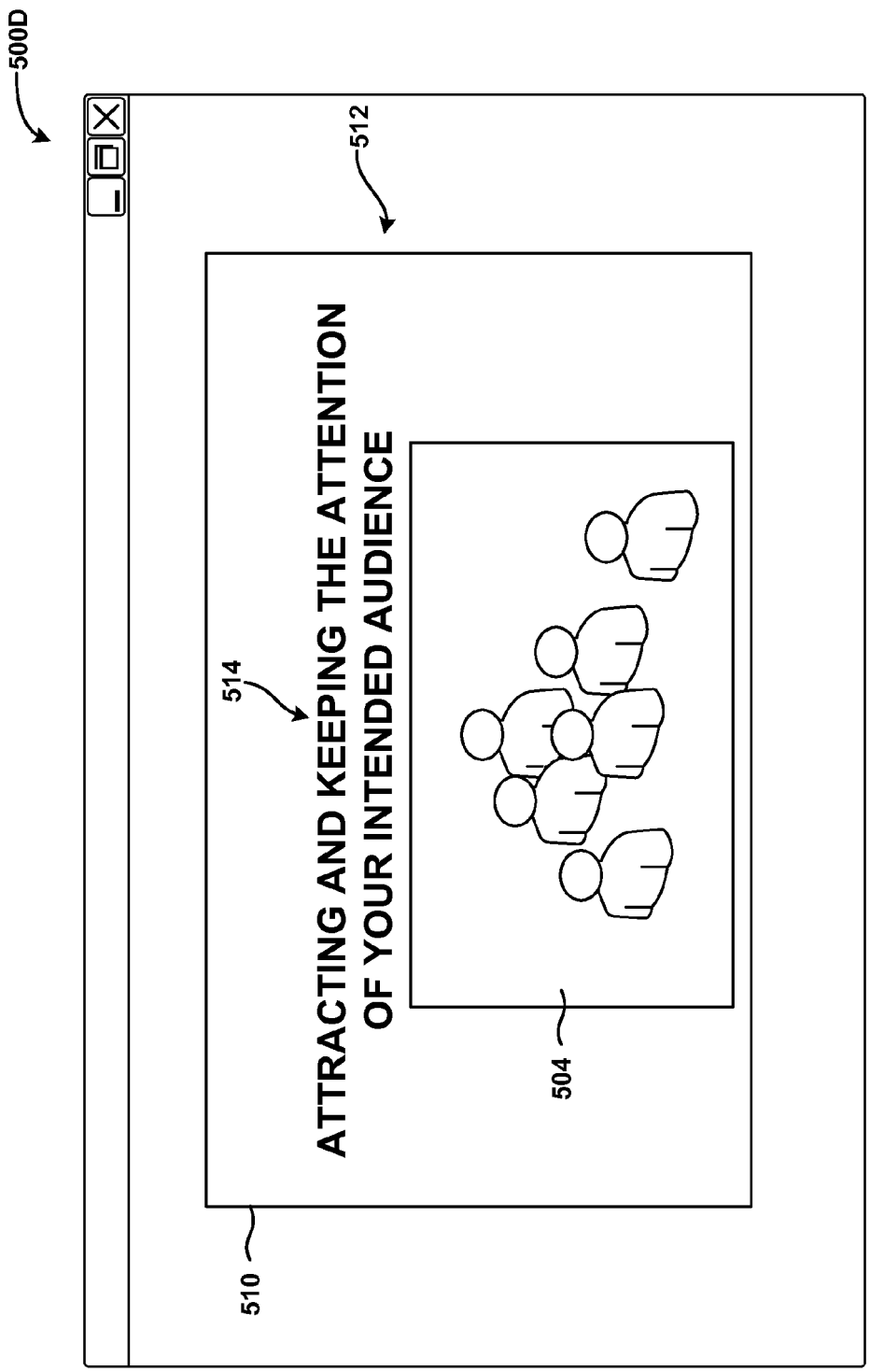

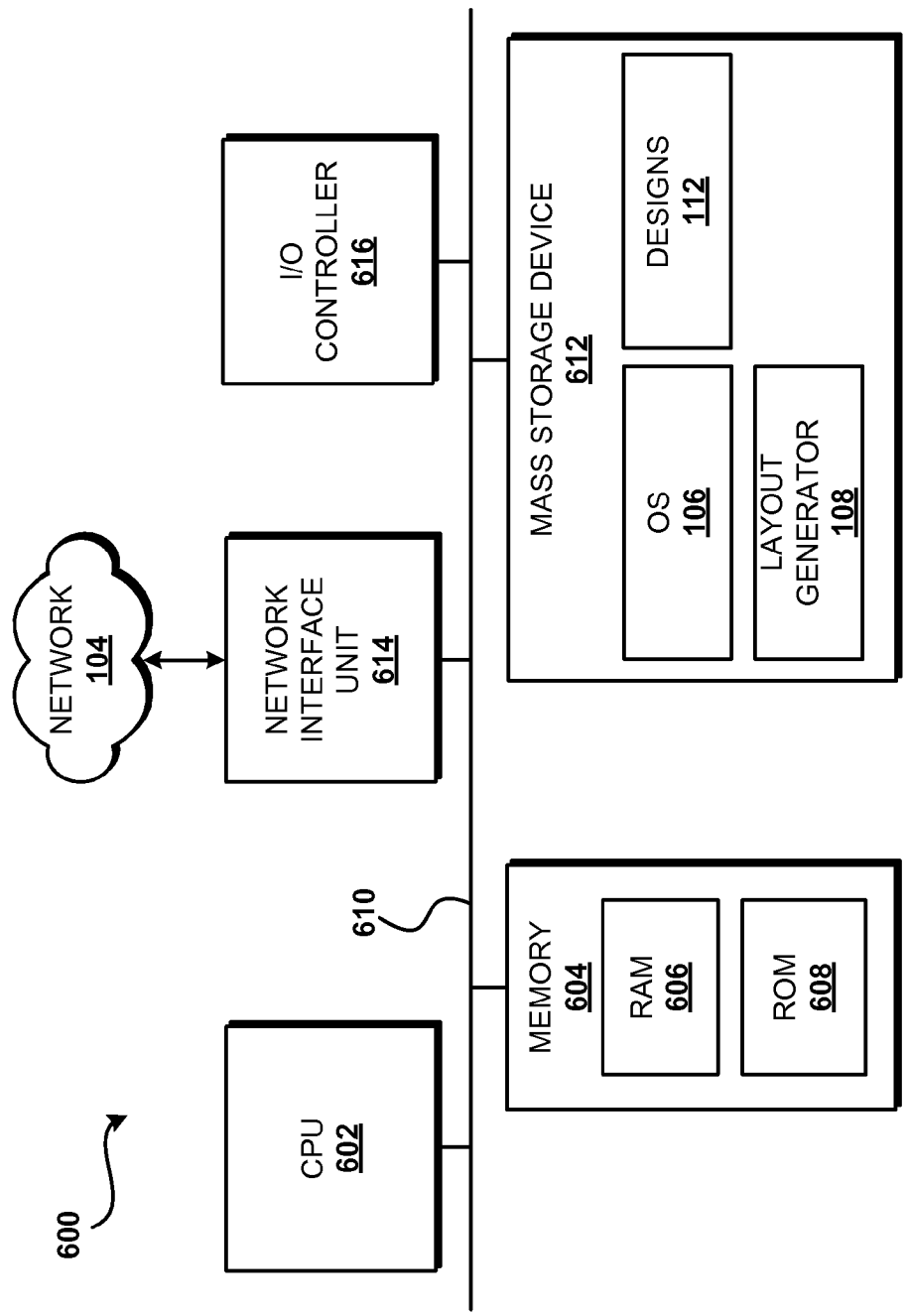

TRANSFORMING DATA TO CREATE LAYOUTS

BACKGROUND

Various application programs, modules, or other types of software can be used to publish visual content or other information. As such, data sharing has become commonplace among software users. With respect to visual content in particular, users sometimes wish to publish visual content with other types of content such as text or other information in a single published document. For example, users may wish to create a flyer, a layout, a pamphlet, a website, an advertisement, a social networking update, an image, or the like, that includes visual content as well as other content such as text.

Because many users are not well-versed in design concepts that can be used to present the data in a meaningful format for viewers, the data published by these users may not be readily consumable and/or understood by viewers. Additionally, visual content sometimes is published quickly without consideration of how the data may best be provided to consumers of the data. As such, formats chosen to present visual content or other data may or may not be ideal. In particular, the published content may lack a format that allows the data to be useful for viewers. As such, challenges exist for publishers and/or consumers of visual content due to the increasing volume and frequency of publication of this type of content, and the challenges of presenting the visual content in a meaningful way.

It is with respect to these and other considerations that the disclosure made herein is presented.

SUMMARY

Concepts and technologies are described herein for transforming data to create layouts. In accordance with the concepts and technologies disclosed herein, a device, an application, or a technology layer provided by hardware and/or software within a computing device can correspond to or provide functionality associated with a layout generator. In some embodiments, a computing device executes a layout generator. Via execution of the layout generator, the computing device can be configured to receive, retrieve, or otherwise obtain data. The data can include visual content such as images and other content such as text. The computing device can analyze at least one image included in the data to identify a salient region associated with the image. In some embodiments, the computing device also can be configured to analyze the image to identify an invariant region associated with the image.

As used herein, the term "salient region" can be used to refer to a portion of an image that includes what can be considered to be an "important" portion of the image. For example, if image includes people, the salient region can be determined to include one or more faces of the people in an image. Similarly, the salient region can be identified as buildings in architectural photos, flowers or other vividly colored items among trees, grass, or other relatively monotonously-colored backgrounds, or the like. In some embodiments, the salient region can be identified by the computing device based upon patterns, color variances, sharpness or blurring, facial recognition, or other processes. As such, the salient region can correspond to an area, region, or other portion of an image that can be determined to be a focal point or subject of the image. Similarly, the term "invariant region" as used herein can be used to refer to an area, region, or portion of the image that has a relatively consistent color, color scheme, color differences, luminance, sharpness, blur, pattern, or the like, that can be determined to be a location at which text included in the data could be located with respect to the image over the invariant region, achieving reasonable and consistent contrast between the foreground text and the background image. In some examples, the invariant region can correspond to a relatively uniform portion of the image such as a blue sky in a landscape photograph, a wall or other background behind human subjects, or the like. Salient regions and invariant regions may or may not be mutually exclusive. For example, in some cases invariant regions can be contained within the salient regions or can overlap the salient regions.

The computing device can be configured to store or access one or more layout designs ("designs"). The designs can be generated by designers or other entities and stored at a data storage device at or in communication with the computing device. The designs can include a viewport frame that corresponds to and/or defines visible limits or extents of a layout or other output to be generated by the layout generator. The designs also can include one or more salient region placement frames defining a location within the layout at which a salient region of the image is to be located. The designs also can include one or more text placement frames defining a location within the layout at which text and/or an invariant region of the image is to be located. The computing device can compare the analyzed data to one or more designs to determine if the visual content and/or any text included in the data match, or are conducive to the use of, one or more of the designs. A matching design, or a highest-ranked design if multiple matching designs are identified, can be selected. The computing device can load the data into the selected design to generate the layout.

Layout designs also can be automatically generated by the computing device based, at least partially, upon predefined rules such as an aspect ratio and/or size range of the viewport, locations and/or sizes of the salient regions frames, locations and/or sizes of the text placement frames, or the like. For example, some rules can specify generating design layouts containing a viewport with aspect ratios between 2 and 0.5 with five steps, with salient region frames of sizes between 0.1 to 0.5 of the viewport area located on the top, left, right and/or bottom of the viewport. Numbers of possible permutations can be produced via this process, which can be used in addition to or instead of stored design layouts as described and illustrated herein. It therefore should be understood that the design layout generation embodiments described and illustrated herein are illustrative, and should not be construed as being limiting in any way.

In generating the layout, the computing device can adjust a position of the image within the viewport frame such that a salient region of the image is located within the viewport frame at a position that corresponds to a salient region placement frame associated with the design, effectively cropping the original image. Similarly, the computing device can adjust a position of the image within the viewport frame such that an invariant region of the image is located within the viewport frame at a position that corresponds to a text placement frame associated with the design. The computing device can place the text at the location of the text placement frame, and the computing device can generate or create the layout or other form of the output for viewing, printing, saving, publishing, or other activity. If the computing device does not identify a design determined to be a match for the data, the computing device can scale, scroll, pan, or otherwise modify the image to match one of the designs. In some embodiments, the computing device places the text at a location within the layout that does not overlay the scaled image. As such, the computing device can generate a layout whether or not any designs match the salient region and/or invariant region of the image.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3C are line drawings schematically illustrating aspects of designs, according to various illustrative embodiments.

FIGS. 5A-5D are user interface diagrams showing aspects of user interfaces for loading data into the designs to create the layouts, according to various illustrative embodiments.

FIG. 6 is a computer architecture diagram illustrating an illustrative computer hardware and software architecture for a computing system capable of implementing aspects of the embodiments presented herein.

DETAILED DESCRIPTION

Figure 1:
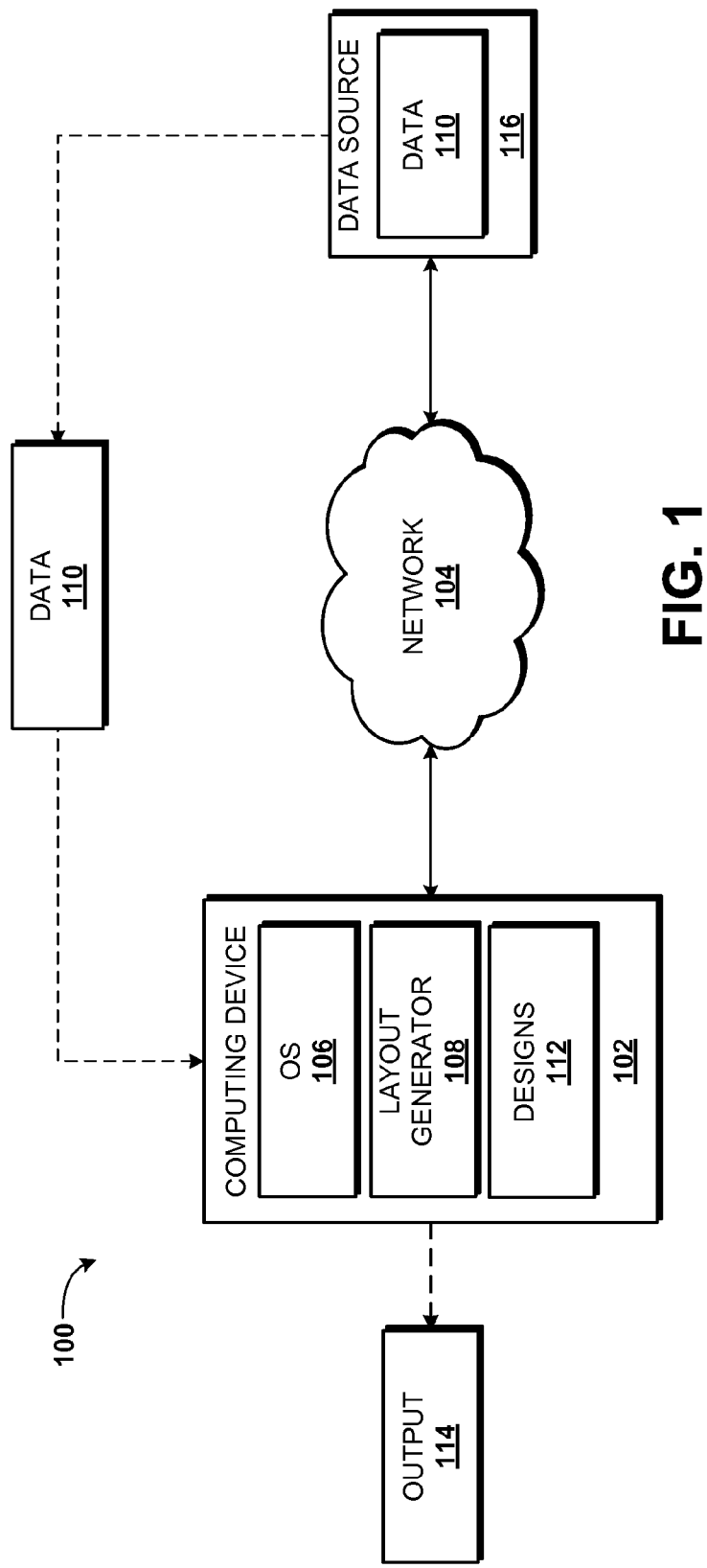
FIG. 1 is a system diagram illustrating an illustrative operating environment for the various embodiments disclosed herein.

The following detailed description is directed to concepts and technologies for transforming data to create layouts. According to the concepts and technologies described herein, a device such as a computing device can access or execute an application or technology layer that provides a layout generator. The computing device can obtain data that includes visual content such as images and other content such as text. The data can be obtained from an application or device at, in communication with, and/or remote from the computing device. The computing device can analyze one or more images included in the data to identify a salient region of the image. The computing device also can be configured to analyze the image to identify an invariant region associated with the image.

The computing device can be configured to store or access one or more designs and to evaluate the designs to determine if one or more of the designs matches the data obtained by the computing device. The computing device can identify a matching design based upon the determined salient region and/or invariant region of the image as well as locations within a matching design of a salient region placement frame and/or a text placement frame. In some embodiments, the computing device can identify a single design that matches the data and in some other embodiments, the computing device can identify a number of designs that match the data. If multiple matching designs are identified, the matching designs can be ranked and a highest-ranked design can be selected.

The computing device can be configured to load the data into the selected design to generate the layout. In generating the layout, the computing device can be configured to transform the data by cropping, scaling, panning, scrolling, extending, infilling, seam carving, and/or otherwise modifying visual content included in the data, as well as overlaying the image with the text included in the data. If a design that accommodates the visual content and the text cannot be identified by the computing device, the computing device can transform the data by scaling and/or shifting the image and placing the text outside of the image to generate the layout. The generated layout can be output by the computing device for storage, viewing, publishing, or other uses.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for transforming data to create layouts will be presented.

Referring now to FIG. 1, aspects of one operating environment 100 for the various embodiments presented herein will be described. The operating environment 100 shown in FIG. 1 can include a computing device 102. According to various embodiments, the functionality of the computing device 102 can be provided by a personal computer ("PC") such as a desktop, tablet, workstation, or laptop computer system. The functionality of the computing device 102 also can be provided by other types of computing systems including, but not limited to, server computers, handheld computers, netbook computers, notebook computers, embedded computer systems, personal digital assistants, mobile telephones, tablet or slate computers, smart phones, or other devices or systems capable of executing the various software elements described herein. Because other computing systems can be used to provide the functionality described herein, the above examples of the computing device 102 should be understood as being illustrative and should not be construed as being limiting in any way.

According to some embodiments, the computing device 102 is configured to operate in communication with, or as a part of, a communications network ("network") 104. In some other embodiments, the computing device 102 does not operate in communication with the network 104 and/or functionality of the computing device 102 described herein can be provided without accessing the network 104. The computing device 102 can be configured to execute an operating system 106 and one or more application programs, modules, software elements, or other computer-executable or computer-executable instructions such as, for example, a layout generator 108 and/or other computer-executable instructions.

The operating system 106 is a computer program for controlling the operation of the computing device 102. The layout generator 108 can include an executable program configured to execute on top of the operating system 106 to provide the functionality described herein for creating layouts. Although the layout generator 108 is illustrated as a component of the computing device 102, it should be understood that the layout generator 108 may be embodied as or in a stand-alone device or components thereof operating as part of or in communication with the network 104 and/or the computing device 102. The layout generator 108 also can be a virtualized service or technology layer that executes on the computing device 102 and/or on other real or virtual devices in communication with the computing device 102. Thus, the illustrated embodiment is illustrative, and should not be construed as being limiting in any way.

As will be explained in more detail below, the layout generator 108 can be configured to obtain data 110. The data 110 obtained by the layout generator 108 can include visual content such as one or more images, video, or the like, as well as other content such as text to be presented with the visual content. For purposes of illustrating and describing the concepts and technologies disclosed herein, the visual content is referred to herein as "images." Because types of visual content are contemplated and are possible, it should be understood that this embodiment is illustrative, and should not be construed as being limiting in any way.

The layout generator 108 can analyze at least one image included in the data 110 to identify one or more salient regions of the image. As used herein, the term "salient region" can be used to refer to a portion of an image that is determined to be an important portion of the image, a focal point of the image, a subject of the image, or the like. The layout generator 108 can identify a salient region based upon color differences at, near, or within the salient region; color or texture patters at, near, or within the salient region; facial recognition; object recognition; brightness and/or metering data; blurring or sharpness at, near, or within the salient region; color distributions at, near, or within the salient region, or the like. For example, the layout generator 108 can identify a salient region corresponding to a face in an image that includes a person. It should be understood that in some embodiments, the layout generator 108 can identify multiple salient regions in a particular image. Because other approaches for identifying one or more salient regions are contemplated, it should be understood that these embodiments are illustrative, and should not be construed as being limiting in any way.

The layout generator 108 also can analyze at least one image to identify one or more invariant regions of the image. The term "invariant region," as used herein, can be used to refer to a portion of an image that is determined by the layout generator 108 to correspond to a location conducive for text placement; to include constant or relatively (relative to other portions of the image) constant coloring, luminance, patterns, sharpness, brightness, contrast, textures; or the like. For example, if an image includes a subject such as a person or building surrounded by a relatively solid color background such as a blue sky with wispy white clouds, a field, a wall, or the like, the layout generator 108 may designate the background as an invariant region. As such, the background can correspond to a location within the image onto which text can be overlaid or located. In particular, the layout generator 108 can be configured to place text at a location corresponding to the invariant region of the image such that the text can be easy to read (relative to text placed on top of a varying background or foreground). An example of identifying an invariant region is set forth below in detail with reference to FIGS. 2 and 5A-5D. Because other approaches for identifying invariant regions are contemplated, it should be understood that these embodiments are illustrative, and should not be construed as being limiting in any way.

The layout generator 108 can be configured to identify salient regions and/or invariant regions within an image or other visual content included in the data 110. The layout generator 108 also can be configured to generate, store, access, and/or use one or more designs 112. The designs 112 can correspond to frames or guides for generating layout or output 114. In particular, the layout generator 108 can use the designs 112 as rules or guides for transforming one or more images and one or more instances of text in the data 110 into a layout or other form of the output 114. According to various embodiments, the designs include a viewport frame that can define visible limits or extents of a layout or other form of the output 114, one or more salient region placement frames that define a location within the layout or other form of the output 114 at which a salient region of the image is to be located, and one or more text placement frames that define a location within the layout or other form of the output 114 at which an invariant region of the image and/or the text included in the data 110 is/are to be located in the output 114.

The layout generator 108 can be configured to determine, based upon an analysis of the data 110, one of the designs 112 into which the data 110 can be loaded, and to create the output 114 by loading the data 110 into the determined and/or selected design 112. As will be explained in more detail herein, the designs 112 can include grid-based image and text design layouts that can be created to approximate a number of contemplated design scenarios. The layout generator 108 can be configured to determine, based upon the data 110, which of the designs 112 is to be used to create the output 114 and/or how to modify the data 110 if a design 112 is not identified for the data 110. If the layout generator 108 identifies multiple designs 112 that can be used to create the output 114, the layout generator 108 can be configured to rank the possible designs 112 and select a highest-ranked design of the possible designs 112. The designs 112, the selection of a design 112, and the application of the data 110 to the chosen design 112 will be described in more detail below, particularly with reference to FIGS. 2-5D.

According to various embodiments, the computing device 102 can be configured to create, generate, receive, and/or store the data 110. For example, the data 110 can be stored at the computing device 102 in a memory, disk drive, or other data storage elements. In some other embodiments such as the embodiment illustrated in FIG. 1, the data 110 can be obtained from a data source 116 that can be configured to operate as part of or in communication with the network 104. The functionality of the data source 116 can be provided by a network drive, a server computer operating on or in communication with the network 104, a database or other real or virtual data storage elements, and/or other data storage devices. In some embodiments, wherein the layout generator 108 operates a technology layer within the computing device 102, the data 110 can be obtained from an application or storage device and loaded into or otherwise provided to the layout generator 108. As such, it should be understood that the illustrated and described embodiments of the operating environment 100 are illustrative, and should not be construed as being limiting in any way.

According to various aspects of the concepts and technologies disclosed herein, the layout generator 108 can be included as part of one or more applications, programs, software, computer-executable instructions, and/or other data, or can be provided as a technology layer executing on the computing device 102 and/or elsewhere to modify content generated by the one or more instances of computer-executable instructions. The various aspects of the layout generator 108 described herein can be provided by a single or multiple applications or modules. Thus, the computing device 102 can, by execution of the layout generator 108, receive the data 110; determine a design 112 into which to load the data 110; identify one or more salient region(s) and/or one or more invariant region(s) within an image included in the data 110; load the data 110 into the determined design, and generate the output 114.

Some or all of the designs 112 can be associated with or have associated with the designs 112 a set of rules for applying the data 110 to the designs 112. The rules can define how the data 110 is applied to a particular design 112. As mentioned above, the rules can be embodied as a viewport frame, one or more salient region placement frames, and/or one or more text placement frames. The computing device 102 can be configured to load the data 110 into a selected design 112 based upon the rules associated with the design 112. The computing device 102 can be configured to display the output 114 for a user or other entity, or to store the output 114 at a data storage device, if desired.

According to some embodiments of the concepts and technologies disclosed herein, the computing device 102 also is configured to obtain and apply user feedback to the designs 112 and/or to the output 114. In some embodiments, the computing device 102 can prompt for, and/or receive without prompting, user feedback. The feedback can include user responses to various prompts or questions. For example, the computing device 102 can present questions to a user or other entity for evaluating various aspects of the output 114. In some embodiments, the computing device 102 asks or prompts a user or other entity for feedback regarding layouts, text placement, scales and/or positions of images, element locations, image sizes, or other aspects of the output 114 by expressing whether that particular aspect is liked or disliked. Based upon the expressed likes and/or dislikes, the computing device 102 can be configured to update the output 114 and/or to modify one or more of the designs 112. The computing device 102 also can be configured to generate a new design 112 based upon the feedback, if desired.

It should be understood that the computing device 102 can prompt a user if a particular aspect of the output 114 is liked or disliked, good or bad, or the like. The feedback, questions, prompts, or the like can be formatted as questions with binary yes/no, like/dislike, or true/false answers. The questions or prompts also can request rankings over various ranges such as, for example, scales of numbers such as one to ten, one to one hundred, letter grades such as "A" through "F," numbers of stars, or the like. The user can provide this and/or other types of feedback with respect to the entirety of the output 114 and/or the computing device 102 can be configured to ask the user to express this feedback regarding individual parts or components of the output 114. For example, the computing device 102 can be configured to ask if the output 114 is liked or disliked, or to ask if a particular aspect or component of the output 114 is liked or disliked. Because other approaches for expressing likes and/or dislikes with respect to the output 114 are possible and are contemplated, it should be understood that these embodiments are illustrative, and should not be construed as being limiting in any way.

FIG. 1 illustrates one computing device 102, one network 104, and one data source 116. It should be understood, however, that some implementations of the operating environment 100 include multiple computing devices 102, multiple networks 104, zero or multiple data sources 116 and/or additional or alternative hardware elements. Thus, the illustrated embodiments should be understood as being illustrative, and should not be construed as being limiting in any way.

Figure 2:
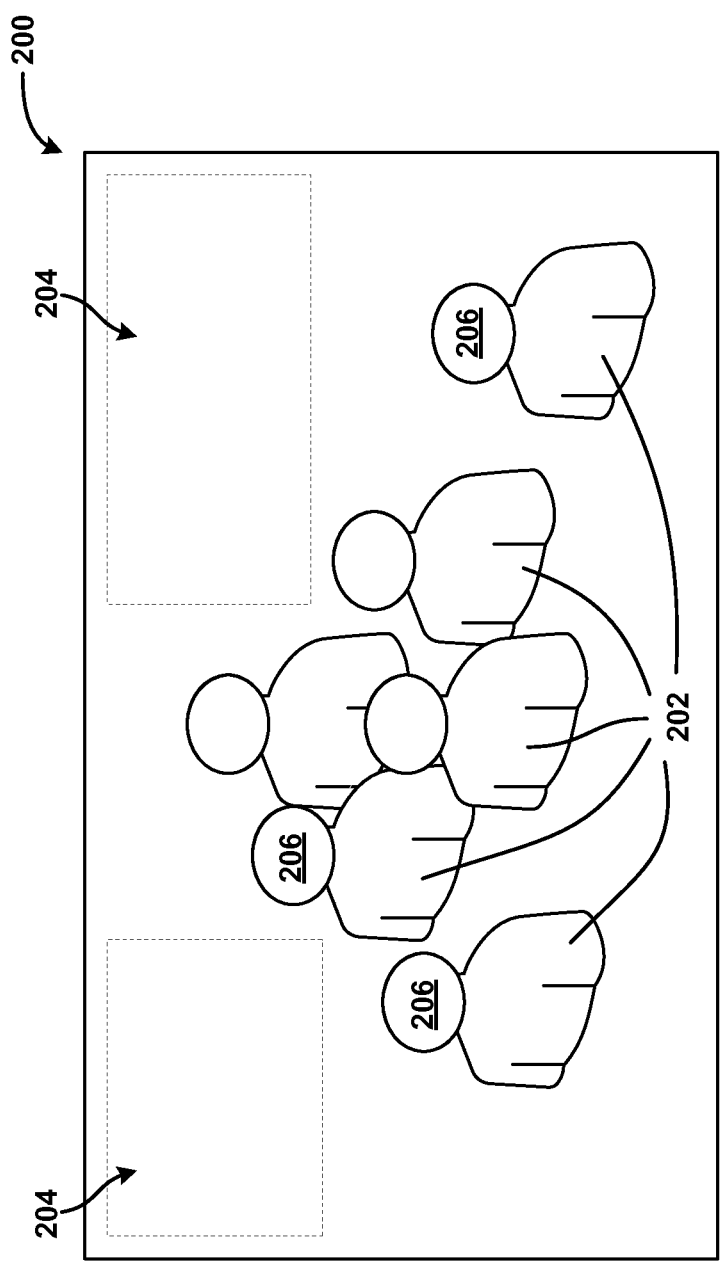
FIG. 2 is a line drawing illustrating an example image and the identification of a salient region and/or an invariant region of the image, according to an illustrative embodiment.

Turning now to FIG. 2, a line diagram showing aspects of an image and the identification of a salient region and/or an invariant region will be described according to an illustrative embodiment. FIG. 2 shows an illustrative sample image ("image") 200. It should be appreciated that the image 200 illustrated in FIG. 2 is illustrative of one example embodiment, and therefore should not be construed as being limited in any way.

As shown in FIG. 2, the image 200 can include multiple people, faces, or other subjects ("people") 202. It can be appreciated that the example image 200 is provided only for purposes of illustration. As such, the people 202 are merely illustrative of one contemplated embodiment of an image subject, and should not be construed as being limiting in any way. Although not necessarily present in every instance of visual content such as the image 200, the image 200 includes empty space areas ("empty space") 204. As used herein, the term "empty space" can refer to space within an image such as the image 200 that is not occupied (or is only partially occupied) by important or salient aspects of the image 200. As such, the empty space 204 can include, but is not limited to, an invariant region of an image as described herein. For example, the empty space 204 can include a region or portion of the image 200 that has substantially constant coloring, color distribution, luminance, patterns, textures, sharpness, blurring, brightness, contract, or the like. The above examples of identifying the empty space 204 should be understood as being illustrative and should not be construed as being limiting in any way.

In accordance with some embodiments of the concepts and technologies disclosed herein, the computing device 102 can be configured to identify the people 200 and/or one or more portions thereof as corresponding to a salient region as described above. In particular, the faces 206 of the people 200 can be determined to correspond to a salient region of the image 200 by the computing device 102 and/or the layout generator 108. In some embodiments, the computing device 102 can identify a region that encompasses all of the faces 206, a portion of each of the faces 206, and/or a portion of one or more of the faces 206 as corresponding to the salient region. It should be understood that this embodiment is illustrative, and should not be construed as being limiting in any way.

Similarly, the computing device 102 can identify one or more of the empty spaces 204 and/or portions thereof as corresponding to an invariant region as explained above. Thus, the computing device 102 can be configured to determine that an invariant region corresponding to the empty spaces 204 may be used for placement of text, or the like, when the layout or other form of the output 114 is generated. Several example designs 112 and loading data into the designs 112 are illustrated and described below in more detail with reference to FIGS. 3A-5D.

Figure 3B:
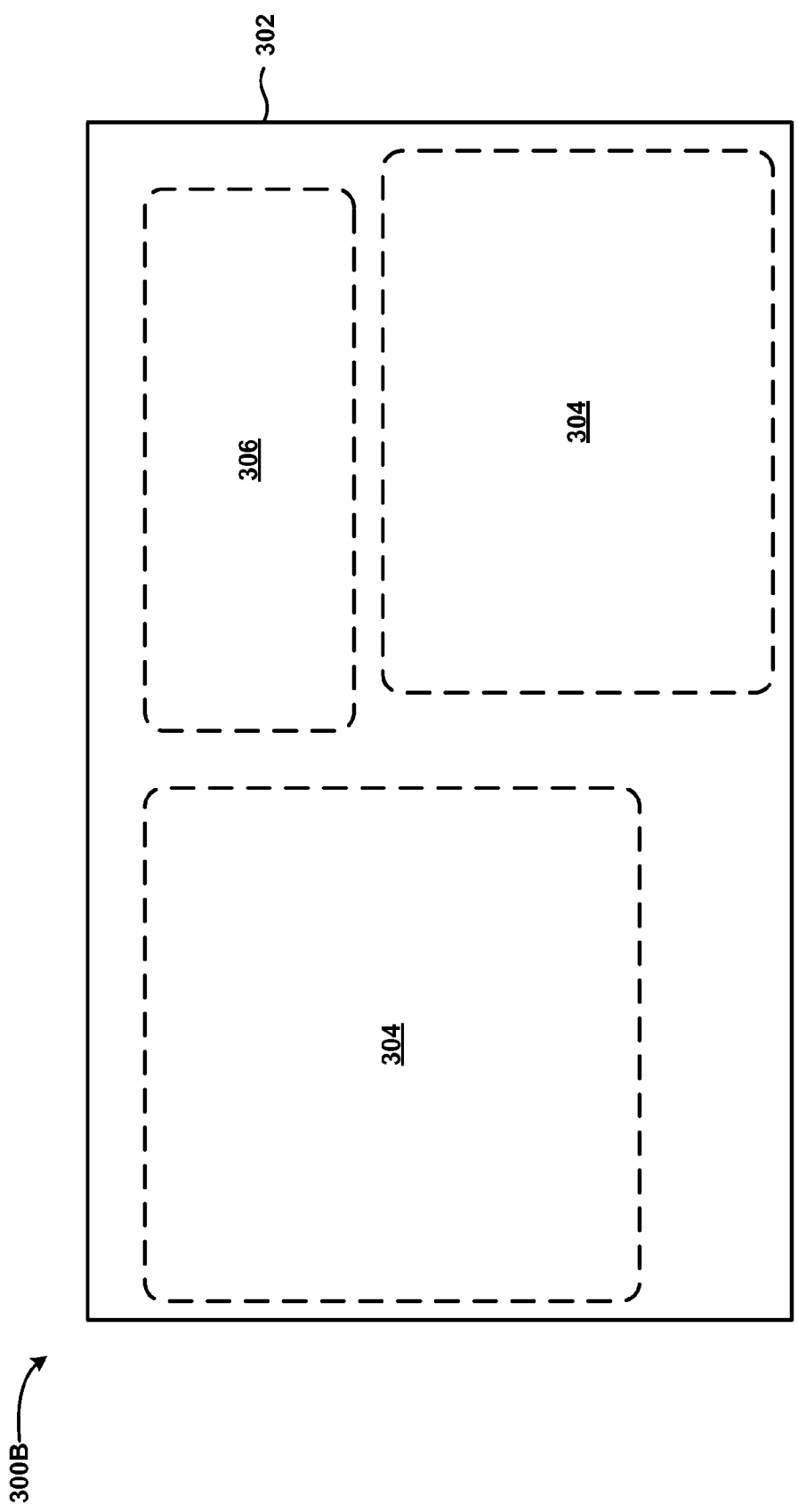
Figure 3C:
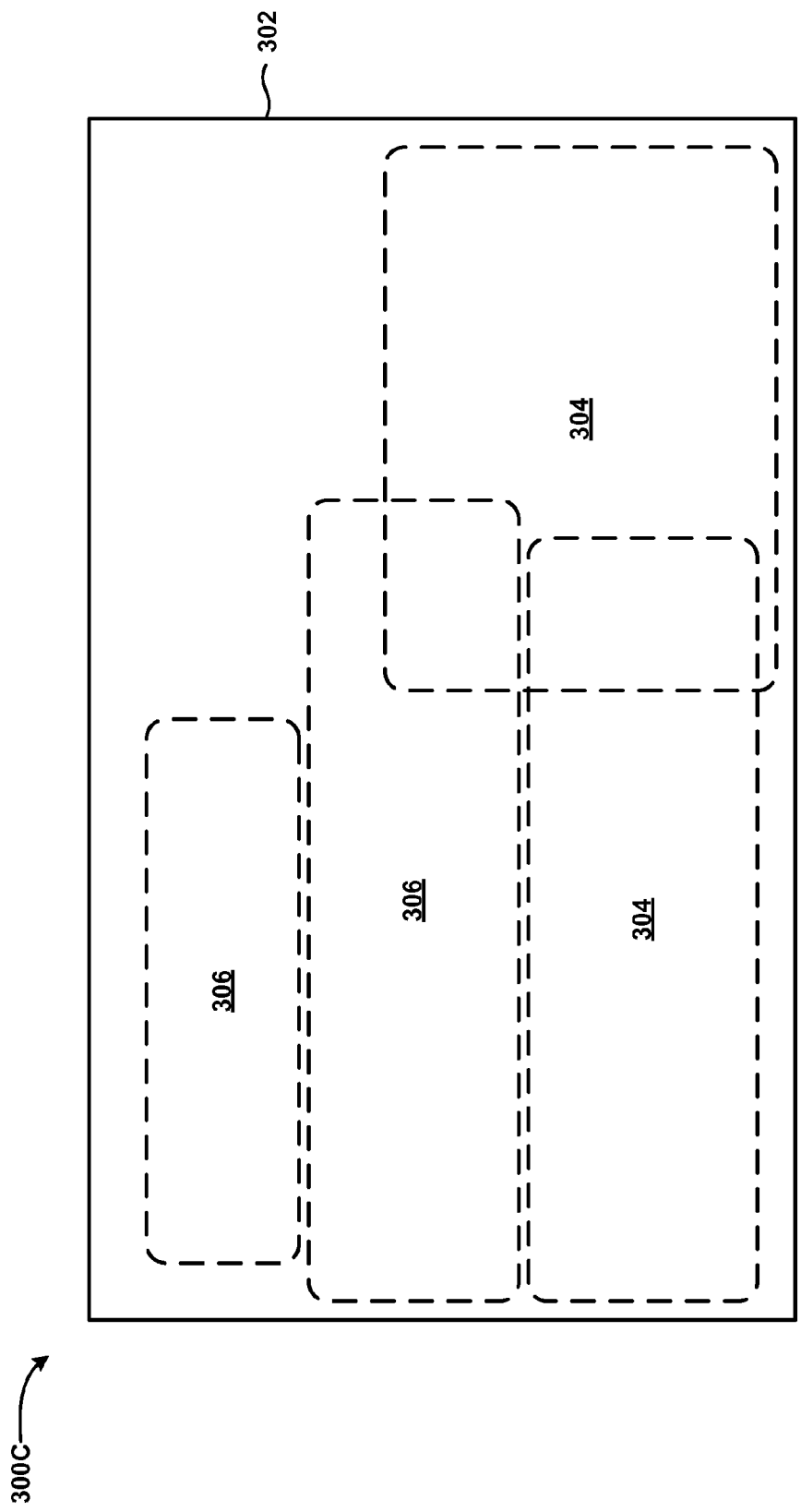

Turning now to FIGS. 3A-3C, additional aspects of the designs 112 are illustrated, according to some illustrative embodiments. According to various embodiments of the concepts and technologies disclosed herein, a library of designs 112 can be maintained and/or accessed by the computing device 102. The library of designs 112 can include any number of designs 112. As such, the illustrated embodiments are provided only for illustration of various aspects of the concepts and technologies disclosed herein and should not be construed as being limiting in any way.

Referring to FIG. 3A, an example design 112 is schematically illustrated as having a grid-based layout design 300A. The grid-based layout design 300A includes a viewport frame 302 that can correspond to the limits or extents of the desired layout. Thus, the viewport frame 302 can correspond to the viewable portion of the layout or other output 114 generated by the layout generator 108. The grid-based layout design 300A also includes two salient region placement frames 304.

The salient region placement frames 304 can correspond to a placement area, region, or location for a salient region of an image within the output 114 generated by the layout generator 108. Thus, the salient region placement frames 304 can correspond to an area or region at which the salient region of an image is to be placed or located within a visible portion of a layout or other form of output 114. As mentioned above, the visible limits of the layout or other form of the output 114 can be defined by the viewport frame 302. The grid-based layout design 300A is illustrated in FIG. 3A as including two salient region placement frames 304. It should be understood, however, that the designs 112 can include less than two salient region placement frames 304, two salient region placement frames 304, and/or more than two salient region placement frames 304. As such, the illustrated embodiment should not be construed as being limiting in any way.

It further can be appreciated with reference to FIG. 3A that one or more of the salient region placement frames 304 can extend out of the viewable space of the output 114 as defined by the viewport frame 302. During generation of the output 114, the image or other visual content can be panned, scrolled, moved, and/or otherwise located with respect to the viewport frame 302 such that a portion of the salient region of the image can be located at the location corresponding to one or more of the salient region placement frames 304. As such, the image may be located with respect to the viewport frame 302 such that a portion of the image may extend beyond the viewport frame 302.

Similarly, because an image can include more than one salient region, it should be understood that the layout generator 108 can be configured to place one or more salient regions of the image at one or more of the salient region placement frames 304. As such, one or more of the salient regions of an image may or may not be placed at locations that correspond to the salient region placement frames 304 shown in FIG. 3A. An example method for applying the data 110 to the design 112 and placement of a salient region of an image included in the data 110 at the salient region placement frames 304 is set forth below in more detail in FIG. 4.

Referring now to FIG. 3B, another example design 112 is schematically illustrated as having a grid-based layout design 300B. The grid-based layout design 300B includes the viewport frame 302. It should be understood that while the viewport frame 302 is illustrated as being rectangular and as having particular dimensions and/or a particular dimension ratio and/or orientation, that the viewport frame 302 can have other shapes, other dimensions, other dimension ratios, and/or other orientations. As such, the illustrated embodiment should not be construed as being limiting in any way.

As shown in FIG. 3B, the grid-based layout design 300B includes two salient region placement frames 304, as described above. The grid-based layout design 300B also includes a text placement frame 306 that can correspond to an area, region, or other location within an image at which text is to be placed by the layout generator 108 during creation of the output 114. As can be appreciated from the above description of the concepts and technologies disclosed herein, the text placement frame 306 can correspond to and/or overlap an invariant region that can be identified by the layout generator 108, though this is not necessarily the case.

The layout generator 108 can be configured to identify one or more invariant regions within an image and to locate the invariant regions of the image at or near the text placement frames 306, if desired. Similarly, the layout generator 108 can identify one or more salient regions of the image or other visual content, and can locate the one or more salient regions at or near the salient region placement frames 304. The layout generator 108 also can place text at or near the text placement frame 306. Although only one text placement frame 306 is shown in FIG. 3B, it should be understood that a design 112 can include multiple text placement frames 306. As such, it should be understood that the illustrated embodiment is illustrative, and should not be construed as being limiting in any way.

Referring now to FIG. 3C, another example design 112 is schematically illustrated as having a grid-based layout design 300C. The grid-based layout design 300C can include the viewport frame 302. Again, it should be understood that the illustrated dimensions, dimension ratio, and/or orientation are illustrative, and that the viewport frame 302 can have other shapes, other dimensions, other dimension ratios, and/or other orientations.

As shown in FIG. 3C, the grid-based layout design 300C includes two salient region placement frames 304, as described above. As shown in FIG. 3C, the salient region placement frames 304 can be arranged such that one or more of the salient region placement frames 304 overlap one another in a particular design 112. Additionally, the grid-based layout design 300C includes two text placement frames 306. As shown, one or more of the text placement frames 306 can overlap one or more of the salient region placement frame 304 in some designs 112. Although two salient region placement frames 304 and two text placement frames 306 are shown in FIG. 3C, it should be understood that a design 112 can include less than two salient region placement frames 304, two salient region placement frames 304, more than two salient region placement frames 304, less than two text placement frames 306, two text placement frames 306, and/or more than two text placement frames 306. As such, it should be understood that this embodiment is illustrative, and should not be construed as being limiting in any way.

In operation of the layout generator 108, the data 110 can be received or retrieved at the computing device 102 for generation of a layout or other form of output 114. The layout generator 108 executed by the computing device 102 can analyze the data 110. During analysis of the data 110, the layout generator 108 can determine if any text is to be included in the output 114. The layout generator 108 also can analyze an image included in the data 110 to identify one or more salient regions within the image and/or one or more invariant regions within the image.

The layout generator 108 can search the designs 112 for a design 112 that matches or approximates the determined salient regions, invariant regions, and/or text associated with the data 110. If no match is found by the layout generator 108, the layout generator can scale, pan, and/or otherwise modify the image and/or text associated with the data 110 to attempt to find a match for the data 110 among the designs 112, as will be explained in more detail below with reference to FIG. 4. The layout generator 108 thus can perform an initial search of the designs 112 for a match and/or can modify the data 110 and perform subsequent searches of the designs 112. If the layout generator 108 identifies a design 112 that matches or approximates the data 110, the layout generator 108 can load the data 110 into the design 112 and generate the output 114. If multiple matching designs 112 are identified, the matching designs 112 can be ranked and a highest-ranked design can be selected.

During loading the data 110 into the design 112, the layout generator 108 can pan, scale, scroll, and/or otherwise move an image relative to the design 112 such that one or more salient region of the image is located at or near a salient region placement frame 304 associated with the particular design 112. The layout generator 108 also can locate text, if any, at or near the text placement frame 306 associated with the particular design 112. The layout or other output 114 can be generated by the layout generator 108. These and other aspects of the transformation of data into a layout will be described in more detail below with reference to FIGS. 4-5D.

Figure 4:
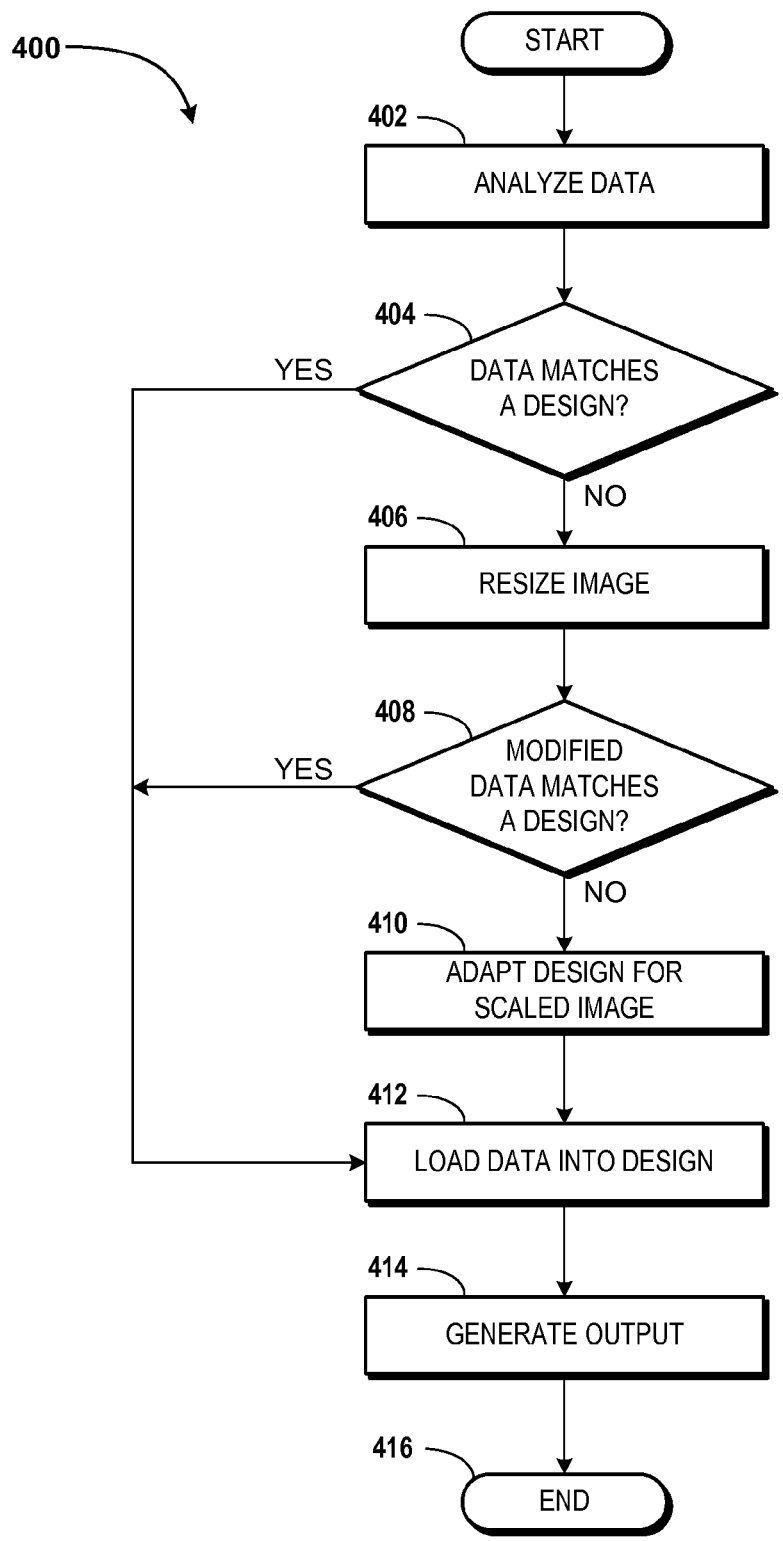
FIG. 4 is a flow diagram showing aspects of a method for creating layouts, according to an illustrative embodiment.

Turning now to FIG. 4, aspects of a method 400 for creating layouts will be described in detail. It should be understood that the operations of the method 400 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 400 can be ended at any time and need not be performed in its entirety. Some or all operations of the method 400, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 400 disclosed herein is described as being performed by the computing device 102 via execution of one or more applications, modules, or other computer-executable instructions such as the layout generator 108. Because additional or alternative devices can execute the functionality described herein via execution of other applications, modules, or computer-executable instructions, it should be understood that this embodiment is illustrative, and should not be viewed as being limiting in any way.

The method 400 begins at operation 402, wherein the computing device 102 analyzes the data 110. The data 110 can be received, retrieved, and/or otherwise obtained by the computing device 102, as explained above, from a memory or other local or remote data storage device, from a locally or remotely executing application or other software, and/or from other computing systems or devices such as server computers, databases, or the like.

During the analysis of the data 110, the computing device 102 can identify an image or other visual content included in the data 110. If the data 110 does not include any visual content, the computing device 102 can obtain other data 110 and/or the method 400 can end. The computing device 102 can analyze the one or more images or other visual content included in the data 110 to identify one or more salient regions within the images. The computing device 102 also can identify one or more invariant regions within the images. The computing device 102 also can determine if the data 110 includes text or other information for including in the layout or other form of the output 114. Although not shown in FIG. 4, the computing device 102 can be configured to present a user interface for obtaining text to be included in the layout. As such, the computing device 102 can be configured to prompt for and obtain the text instead of, or in addition to, obtaining the data 110 that includes the text and the visual content.

From operation 402, the method 400 proceeds to operation 404, wherein the computing device 102 can determine if the data 110 matches a design 112 that is available to the computing device 102. As used herein, the computing device 102 can determine that the data 110 "matches" a design 112 if a particular design includes a salient region placement frame and/or a text placement frame that can be used with the data 110. If a salient region of an image is too big to fit in a salient region placement frame defined by a particular design 112, that design 112 may be determined by the computing device 102 not to match the data 110. If, however, the salient region of the image is sized such that the salient region of the image will fit in the salient region placement frame, the particular design 112 may at least partially match the data 110, subject to the determination that the invariant region of the image matches the text placement frame defined by the design 112.

If the computing device 102 determines that a salient region of the image matches the salient region placement frame of the design 112, and that a text placement frame of a design 112 is located at a location within the layout that is at or near an invariant region of the image (when the salient region of the image is placed at the salient region placement frame), the computing device 102 can determine that the design 112 matches the data 110. Conversely, if a text placement frame of a design 112 is located at a location within the layout that is not at or near an invariant region of the image (when the salient region of the image is placed at the salient region placement frame), the computing device 102 can determine that the design 112 does not match the data 110.

As explained above, the computing device 102 can maintain or access a library of designs 112 that can be stored at the computing device 102 and/or at a location remote from the computing device 102. As such, the computing device 102 can compare the identified salient region(s), invariant region(s), and/or instance(s) of text in the data 110 to the designs 112 to determine if a match exists. In addition to the specific examples above, the computing device 102 can be configured to determine that a match exists between the data 110 and one or more designs 112 based upon various factors including, but not limited to, a number, size, scale, location, and/or orientation of salient region placement frames 304 associated with the design 112; a number, size, scale, location, and/or orientation of text placement frames 306 associated with the design 112; a size, scale, dimension, dimension ratio, and/or orientation of a viewport frame 302 associated with the design 112; and/or other considerations.

In some embodiments, the computing device 102 may identify one or more designs 112 that match the data 110. Although not shown in FIG. 4, the computing device 102 can be configured to compute or generate a score or other indication of a degree to which a design 112 matches the data 110 for each prospective design 112. The computing device 102 can select a highest-ranked design 112 from all considered designs 112. As such, determining that the data 110 matches a design 112 can include ranking several designs 112 and selecting a highest ranked design 112.

If the computing device 102 determines, in operation 404, that the data 110 matches a design 112 (and/or after selecting a highest-ranked design 112 among several matching designs 112), the method 400 proceeds to operation 412, which will be described in more detail below. If the computing device 102 determines in operation 404 that the data 110 does not match a design 112, the method 400 can proceed to operation 406.

In operation 406, the computing device 102 can resize one or more images included in the data 110. In some embodiments, the computing device 102 can resize the images by zooming, panning, scrolling, cropping, extending, infilling, seam carving and/or otherwise modifying size or placement of the image in an attempt to identify a match among the designs 112. It should be understood that the functionality described herein with respect to operation 406 can be iterative. In particular, the computing device 102 can be configured to evaluate different sizes and/or other modifications in an attempt to identify a match among the designs 112. As such, although not shown in FIG. 4, it should be understood that that the computing device 102 can repeat operation 406 a number of times while attempting to identify a match among the designs 112.

Similarly, the process described herein may be different for each of the designs 112, and as such, the computing device 102 can be configured to use different sizes and/or modifications in an attempt to match the salient region(s) and/or the invariant region(s) of the image to the currently evaluated design 112. In some embodiments, the computing device 102 may determine in operation 404 that a salient region of the image is sized such that a match between the data 110 and one or more designs 112 does not exist without modifying the image. As such, the computing device 102 can resize or crop the image, for example as a thumbnail image, in operation 406, and the computing device 102 can again evaluate the available designs 112 to determine if a match exists.

From operation 406, the method 400 can proceed to operation 408, wherein the computing device 102 can determine if the data 110 as modified in operation 406 ("modified data") matches a design 112. It should be understood that the functionality of the computing device 102 shown in operation 408 can be substantially similar to the functionality of the computing device 102 shown in operation 404 above, thought this is not necessarily the case.

If the computing device 102 determines, in operation 408, that the modified data matches a design 112, the method 400 can proceed to operation 412, which is described in more detail below. As explained above, operation 408 can include ranking two or more designs 112 that match the modified data and selecting a highest-ranked design 112 among several matching designs 112. If the computing device 102 determines, in operation 408, that the modified data does not match a design 112, the method 400 can proceed to operation 410.

In operation 410, the computing device 102 can adapt a design 112 for a scaled image. Although not separately illustrated in FIG. 4, the computing device 102 can identify a closest fit among the designs 112 considered in operation 408 and adapt that design 112 for use with a scaled image, though this is not necessarily the case. In some embodiments, the computing device 102 can be configured to adapt the design 112 for generation of a layout or other form of output 114 in which the text is not overlaid on the image.

In some embodiments, the computing device 102 can scale the image, for example as a thumbnail image or other scaled version of the image, and the text can be placed outside of the scaled version of the image to generate the layout or other form of the output 114. An example of this functionality is illustrated and described below with reference to FIG. 5D. As such, the computing device 102 can generate the output 114 even if a match does not exist between the data 110 (or the modified data) and the designs 112. In some embodiments, the computing device 102 can output an adapted design for storage or usage by the computing device 102, though this operation is not separately illustrated in FIG. 4.

From operation 410, the method 400 proceeds to operation 412. As noted above, the method 400 also can proceed to operation 412 from operations 404 and 408. In operation 412, the computing device 102 can load the data 110 or the modified data into the design 112 or the adapted design. Some example embodiments of loading the data 110 into the designs 112 are illustrated and described in additional detail below with reference to FIGS. 5A-5D. Briefly, the computing device 102 can shift, pan, scroll, scale, and/or otherwise move the image such that a salient region of the image is located at a location, relative to the viewport frame of the design 112, that corresponds to a location of a salient region placement frame 304 of the selected design 112. Similarly, the computing device 102 can shift, pan, scroll, scale, and/or otherwise move the image such that an invariant region of the image is located at a location, relative to the viewport frame of the design 112, that corresponds to a location of a text placement frame 306 of the selected design 112. Thus, operation 412 can include moving, scaling, scrolling, and/or otherwise transforming the data 110 to match the selected design 112.

Additionally, operation 412 can include loading the text into the layout at or near a text placement frame of the selected design. It can be appreciated that location at which the text is located can correspond to an invariant region of the image. As such, loading the data 110 into the design 112 can include transforming the location, size, or scale of an image and adding text to the image. In some embodiments, the computing device 102 can be configured to prompt a user or other entity for the text to be loaded into the layout, thought this is not separately shown in FIG. 4.

From operation 412, the method 400 proceeds to operation 414, wherein the computing device 102 can generate the output 114. In operation 414, the computing device 102 can output the generated layout or other form of the output 114. In some embodiments, the output 114 is provided to an application or other software executing on the computing device 102 or on another system or device; to a storage device at or remote from the computing device 102; to other devices or systems; and/or the like. From operation 414, the method 400 proceeds to operation 416. The method 400 ends at operation 416.

Figure 5A:
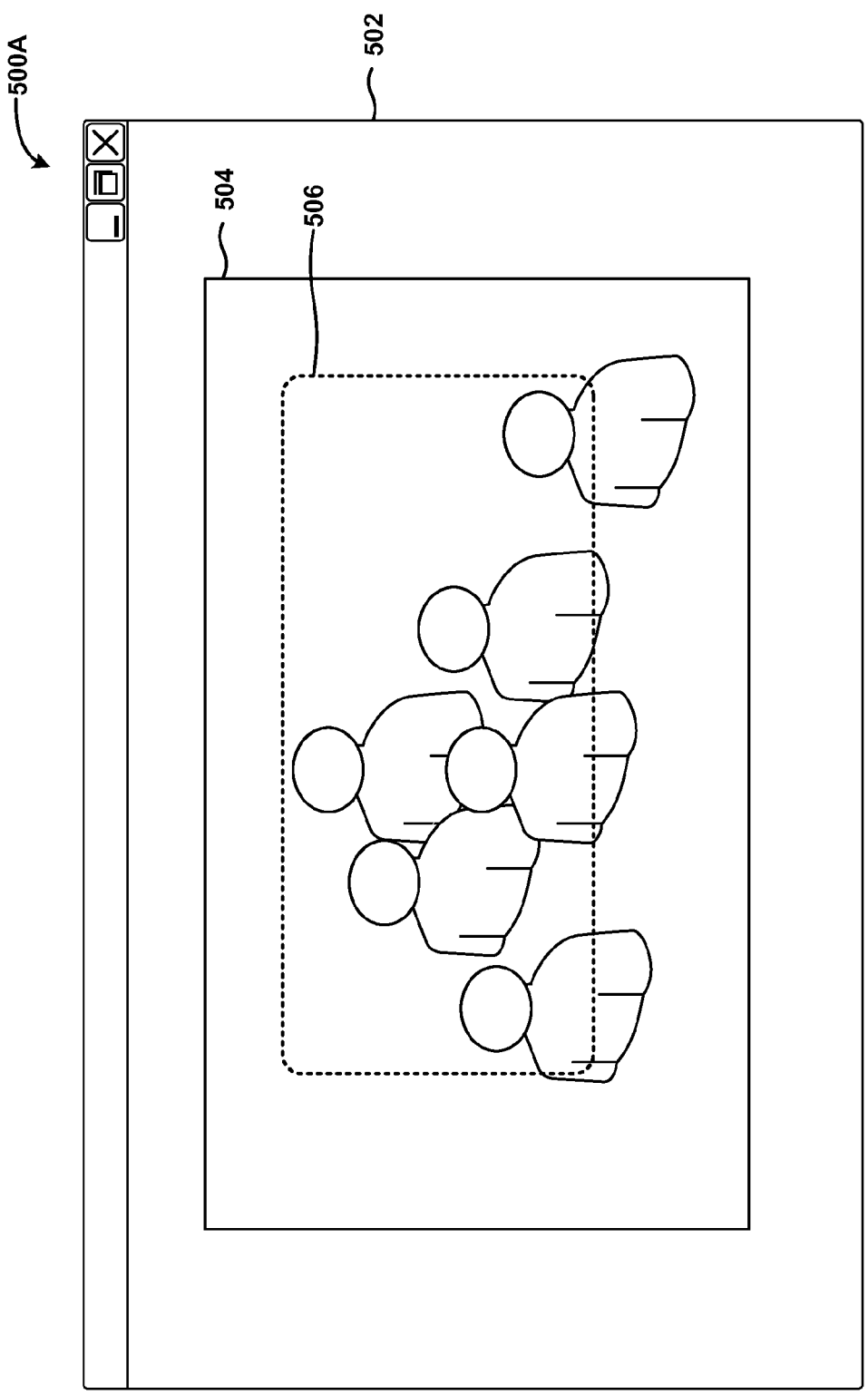

Turning now to FIGS. 5A-5D, UI diagrams showing various aspects of loading the data 110 into the designs 112 will be described according to various illustrative embodiments. FIG. 5A shows an illustrative screen display 500A generated by a device such as the computing device 102. In some embodiments, the screen display 500A corresponds to one or more of the user interfaces generated by one or more applications, modules, or other software executed by the computing device 102. The screen display 500A can include an application window 502 generated by the application or other software. Although not visible in FIG. 5A, the application window 502 can include various menus and/or options.

The application window 502 is illustrated as displaying an image 504. It should be understood that the extents of the image 504 can correspond to the viewport frame of the layout to be generated by the layout generator 108, as explained above, particularly with reference to FIGS. 3A-3C, though this is not necessarily the case. In particular, the extents of the image 504 may or may not correspond to the limits or extents of the viewport frame, in some embodiments. For purposes of illustrating and designing the concepts and technologies disclosed herein, the image 504 corresponds to the image 200 illustrated in FIG. 2 and/or the data 110 described above in FIGS. 1-4. It should be appreciated that the screen display 500A, the application window 502, and/or the image 504 illustrated in FIG. 5A are illustrative of one example embodiment, and therefore should not be construed as being limited in any way.

As shown in FIG. 5A, the layout generator 108 can analyze the image 504 and/or other visual content included in the data 110 to identify one or more salient regions within the visual content. In the example illustrated in FIG. 5A, the layout generator 108 can identify the salient region 506 within the image 504. The salient region 506 can include multiple people, faces, or other subjects. It can be appreciated that a portion of the people or other subjects included in the image 504 can correspond to the salient region 506, and that a portion of the subjects may or may not be included in the salient region 506, depending upon the analysis conducted by the layout generator 108. It should be understood that the screen display 500A is illustrative, and that the analysis of the image 504 can occur without updating a screen display, if desired.

Referring now to FIG. 5B, a UI diagram showing additional aspects of the concepts and technologies disclosed herein for transforming data to create layouts is described in detail. In particular, FIG. 5B shows a screen display 500B generated by a device such as the computing device 102 by transforming the data 110 to load the data 110 into a design 112. As explained above, particularly with reference to FIGS. 3A-4, the computing device 102 can evaluate one or more designs 112 to determine if a design matches the data 110 analyzed by the computing device 102. Upon identifying a design 112, and/or selecting a highest-ranked design from a number of matching designs 112, the computing device 102 can transform the data 110 by loading the data 110 into the selected design 112.

In FIG. 5B, the computing device 102 has shifted the image 504 such that the salient region 506 of the image 504 has been shifted to a location associated with a salient region placement frame 304 associated with a selected design 112. It should be understood that the illustrated location of the salient region 506 is merely illustrative and should not be construed as being limiting in any way. Additionally, the screen display 500B includes a text placement region 508 (that may or may not be displayed for a user), which can be provided for text placement in the layout or other form of the output 114. In FIG. 5B, the viewport frame 510 also is shown. It should be understood that the limits or extents of the image 504 may or may not correspond to the viewport frame 510, as explained above. It can be appreciated with reference to FIG. 5B that the placement of the salient region 506 and the text placement region 508 can correspond to a design 112 described herein, and that the operations for loading the data 110 into the design 112 may be invisible to a user or other entity. As such, the illustration of these operations is provided to illustrate and describe the concepts and technologies disclosed herein, and should not be construed as being limiting in any way.

Figure 5C:
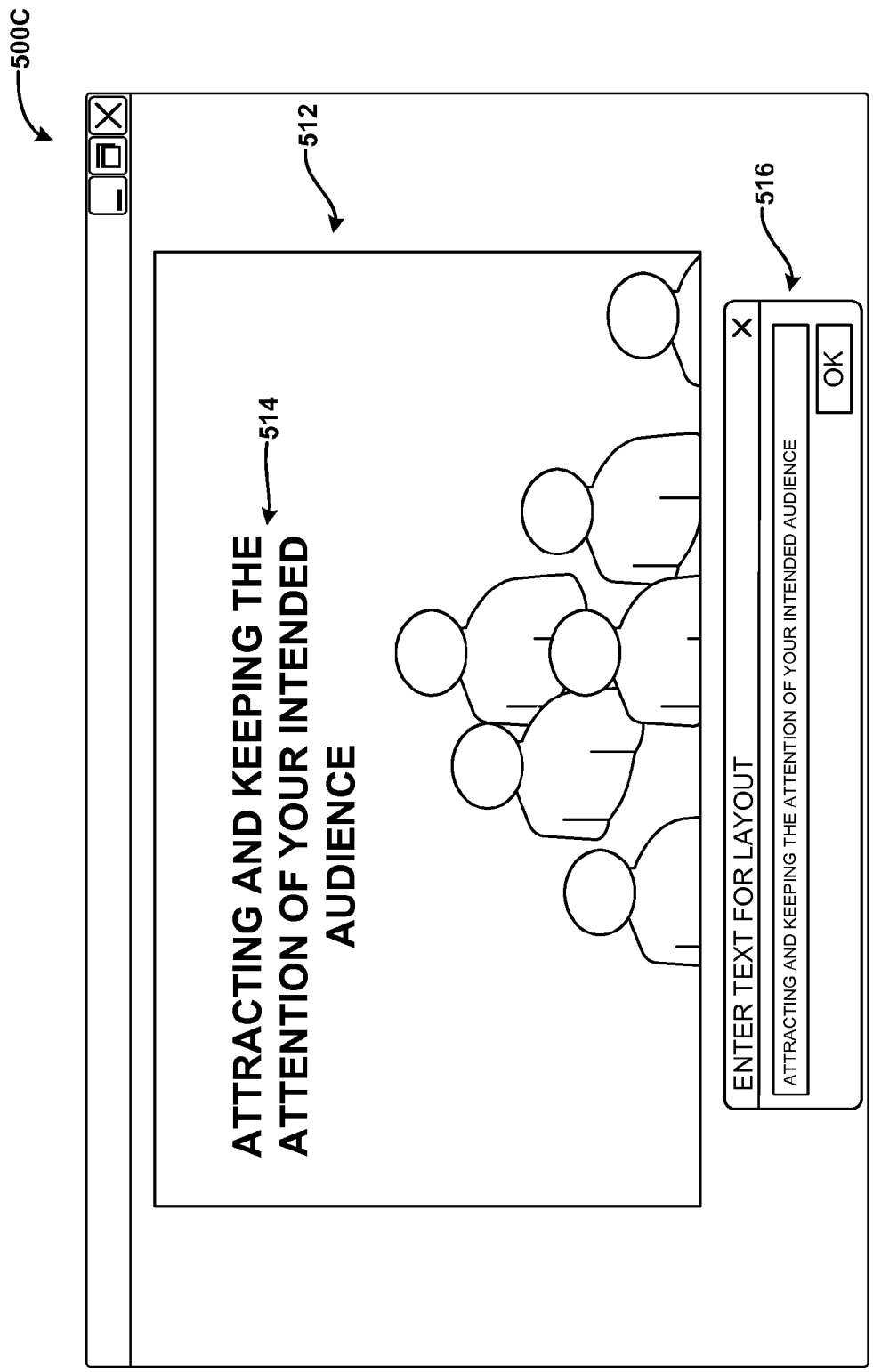

Referring now to FIG. 5C, a UI diagram showing additional aspects of the concepts and technologies disclosed herein for transforming data 110 to create layouts is described in detail. In particular, FIG. 5C shows a screen display 500C generated by a device such as the computing device 102. The screen display 500C shown in FIG. 5C is illustrated as displaying a layout 512. It should be understood from the description of the concepts and technologies disclosed herein that the layout 512 can correspond to and/or can be included in the output 114. As shown, the data 110 has been transformed to create the layout 512 by shifting the image such that a salient region thereof is located such that the text 514 can be accommodated within the image and within the layout 512.

It should be appreciated that the UI diagram illustrated in FIG. 5C is illustrative of one contemplated embodiment, and therefore should not be construed as being limited in any way. Additionally, FIG. 5C illustrates a text entry window 516 that can be displayed to allow a user or other entity to enter the text to be added to the layout 512. Because the text can be obtained in other ways, it should be understood that this embodiment is illustrative, and should not be construed as being limiting in any way.

Referring now to FIG. 5D, a UI diagram showing additional aspects of the concepts and technologies disclosed herein for transforming data 110 to create layouts is described in detail. In particular, FIG. 5D shows a screen display 500D generated by a device such as the computing device 102. The screen display 500D shown in FIG. 5D is illustrated as displaying an alternative embodiment of the layout 512. As shown, the data 110 has been transformed to create the layout 512 by scaling and shifting the image and/or by adapting a design to accommodate the scaled and shifted image and the text included in the data 110. As such, the scaled and shifted image can be located such that the text 514 can be accommodated within the layout 512 at a location that does not overlay or overlap the image 504. As such, a layout 512 can be generated, even if a design 112 does not match the data 110 as described in detail above with reference to FIG. 4.

FIG. 6 illustrates an illustrative computer architecture 600 for a device capable of executing the software components described herein for transforming data to create layouts. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 106 and one or more application programs including, but not limited to, the layout generator 108 and/or other application programs (not illustrated). The mass storage device 612 also can be configured to store the designs 112, if desired.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium" and variations thereof, does not include waves, signals, and/or other transitory and/or intangible communication media, per se.

According to various embodiments, the computer architecture 600 may operate in a networked environment using logical connections to remote computers through a network such as the network 104. The computer architecture 600 may connect to the network 104 through a network interface unit 614 connected to the bus 610. It should be appreciated that the network interface unit 614 also may be utilized to connect to other types of networks and remote computer systems, for example the data source 116 illustrated in FIG. 1, local or remote data storage devices, local or remote systems or networks, or the like. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
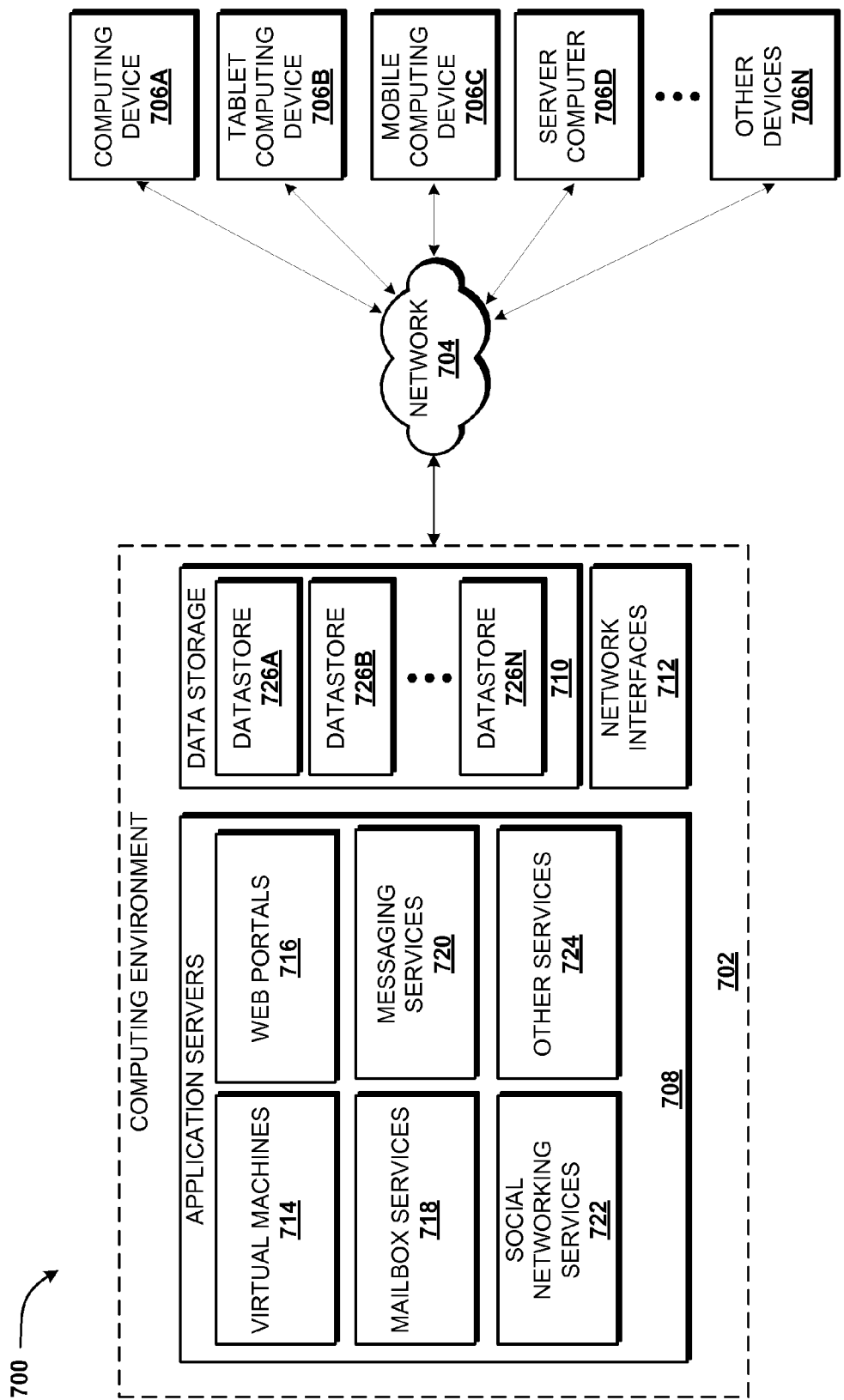
FIG. 7 is a diagram illustrating a distributed computing environment capable of implementing aspects of the embodiments presented herein.

FIG. 7 illustrates an illustrative distributed computing environment 700 capable of executing the software components described herein for transforming data to create layouts. Thus, the distributed computing environment 700 illustrated in FIG. 7 can be used to provide the functionality described herein with respect to the computing device 102. The distributed computing environment 700 thus may be utilized to execute any aspects of the software components presented herein.

According to various implementations, the distributed computing environment 700 includes a computing environment 702 operating on, in communication with, or as part of the network 704. The network 704 also can include various access networks. According to various implementations, the functionality of the network 704 can be provided by the network 104 illustrated in FIG. 1.> One or more client devices 706A-706N (hereinafter referred to collectively and/or generically as "clients 706") can communicate with the computing environment 702 via the network 704 and/or other connections (not illustrated in FIG. 7). In the illustrated embodiment, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated embodiment, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated embodiment, the application servers 708 host one or more virtual machines 714 for hosting applications or other functionality. According to various implementations, the virtual machines 714 host one or more applications and/or software modules for providing the functionality described herein for transforming data to create layouts. It should be understood that this embodiment is illustrative, and should not be construed as being limiting in any way. The application servers 708 also host or provide access to one or more Web portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above embodiments are illustrative, and should not be construed as being limited in any way.

As shown in FIG. 7, the application servers 708 also can host other services, applications, portals, and/or other resources ("other resources") 724. The other resources 724 can include, but are not limited to, a technology layer for providing a layout generation service, a data transformation service, or the like. It thus can be appreciated that the computing environment 702 can provide integration of the concepts and technologies disclosed herein provided herein for transforming data to create layouts with various mailbox, messaging, social networking, and/or other services or resources. For example, the concepts and technologies disclosed herein can be used to create layouts including images and text for social networking updates, realtime messages, status updates, or the like. The layouts or other output 114 also can be exported to a mail program, if desired, directly from the computing device 102.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store the designs 112, the output 114, and/or other data used or generated by the layout generator 108 and/or the computing device 102.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 700 to utilize the functionality described herein for transforming data to create layouts.

Figure 8:
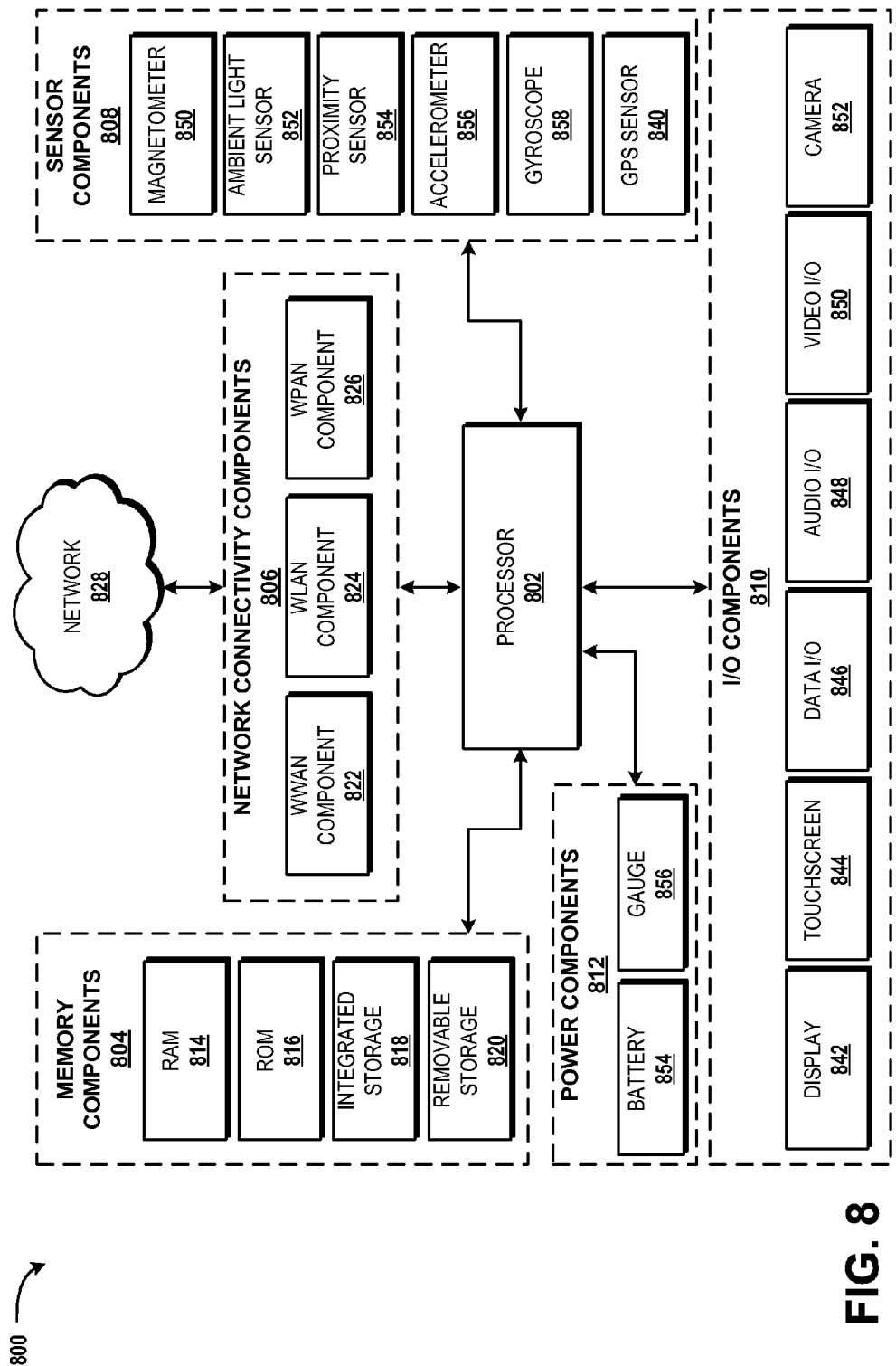
FIG. 8 is a computer architecture diagram illustrating a computing device architecture capable of implementing aspects of the embodiments presented herein.

Turning now to FIG. 8, an illustrative computing device architecture 800 for a computing device that is capable of executing various software components described herein for transforming data to create layouts. The computing device architecture 800 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 800 is applicable to any of the clients 806 shown in FIG. 7. Furthermore, aspects of the computing device architecture 800 may be applicable to traditional desktop computers, portable computers (e.g., laptops, notebooks, ultra-portables, and netbooks), server computers, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated embodiment, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some embodiments, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some embodiments, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720p, 1080p, and greater), video games, three-dimensional ("3D") modeling applications, and the like. In some embodiments, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some embodiments, the processor 802 is fabricated, in part, utilizing a package-on-package ("PoP") integrated circuit packaging technique. Moreover, the processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some embodiments, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some embodiments, the RAM 814 or a portion thereof, the ROM 816 or a portion thereof, and/or some combination the RAM 814 and the ROM 816 is integrated in the processor 802. In some embodiments, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some embodiments, the removable storage 820 is provided in lieu of the integrated storage 818. In other embodiments, the removable storage 820 is provided as additional optional storage. In some embodiments, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which may be a WWAN, a WLAN, or a WPAN. Although a single network 828 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

In some embodiments, the functionality of the network 828 can be provided by the network 104 and/or the network 704. In some embodiments, the network 828 includes the network 104 and/or the network 704. In other embodiments, the network 828 can be configured to provide access to the network 104 and/or the network 704.

The network 828 may be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 828 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 may be configured to provide voice and/or data communications with any combination of the above technologies. The network 828 may be configured to or adapted to provide voice and/or data communications in accordance with future generation technologies.

In some embodiments, the WWAN component 822 is configured to provide dual-multi-mode connectivity to the network 828. For example, the WWAN component 822 may be configured to provide connectivity to the network 828, wherein the network 828 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 828 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 824 is configured to connect to the network 828 via the WI-FI access points. Such connections may be secured via various encryption technologies including, but not limited, WI-FI Protected Access ("WPA"), WPA2, Wired Equivalent Privacy ("WEP"), and the like.

The network 828 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, also may be incorporated in the computing device architecture 800.

The magnetometer 830 is configured to measure the strength and direction of a magnetic field. In some embodiments the magnetometer 830 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 830 are contemplated.

The ambient light sensor 832 is configured to measure ambient light. In some embodiments, the ambient light sensor 832 provides measurements to an application program stored within one the memory components 804 in order to automatically adjust the brightness of a display (described below) to compensate for low-light and high-light environments. Other uses of measurements obtained by the ambient light sensor 832 are contemplated.

The proximity sensor 834 is configured to detect the presence of an object or thing in proximity to the computing device without direct contact. In some embodiments, the proximity sensor 834 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some embodiments, output from the accelerometer 836 is used by an application program as an input mechanism to control some functionality of the application program. For example, the application program may be a video game in which a character, a portion thereof, or an object is moved or otherwise manipulated in response to input received via the accelerometer 836. In some embodiments, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some embodiments, output from the gyroscope 838 is used by an application program as an input mechanism to control some functionality of the application program. For example, the gyroscope 838 can be used for accurate recognition of movement within a 3D environment of a video game application or some other application. In some embodiments, an application program utilizes output from the gyroscope 838 and the accelerometer 836 to enhance control of some functionality of the application program. Other uses of the gyroscope 838 are contemplated.

The GPS sensor 840 is configured to receive signals from GPS satellites for use in calculating a location. The location calculated by the GPS sensor 840 may be used by any application program that requires or benefits from location information. For example, the location calculated by the GPS sensor 840 may be used with a navigation application program to provide directions from the location to a destination or directions from the destination to the location. Moreover, the GPS sensor 840 may be used to provide location information to an external location-based service, such as E911 service. The GPS sensor 840 may obtain location information generated via WI-FI, WIMAX, and/or cellular triangulation techniques utilizing one or more of the network connectivity components 806 to aid the GPS sensor 840 in obtaining a location fix. The GPS sensor 840 may also be used in Assisted GPS ("A-GPS") systems.

The I/O components 810 include a display 842, a touchscreen 844, a data I/O interface component ("data I/O")846, an audio I/O interface component ("audio I/O") 848, a video I/O interface component ("video I/O") 850, and a camera 852. In some embodiments, the display 842 and the touchscreen 844 are combined. In some embodiments two or more of the data I/O component 846, the audio I/O component 848, and the video I/O component 850 are combined. The I/O components 810 may include discrete processors configured to support the various interface described below, or may include processing functionality built-in to the processor 802.

The display 842 is an output device configured to present information in a visual form. In particular, the display 842 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 842 is a liquid crystal display ("LCD") utilizing any active or passive matrix technology and any backlighting technology (if used). In some embodiments, the display 842 is an organic light emitting diode ("OLED") display. Other display types are contemplated.

The touchscreen 844 is an input device configured to detect the presence and location of a touch. The touchscreen 844 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 844 is incorporated on top of the display 842 as a transparent layer to enable a user to use one or more touches to interact with objects or other information presented on the display 842. In other embodiments, the touchscreen 844 is a touch pad incorporated on a surface of the computing device that does not include the display 842. For example, the computing device may have a touchscreen incorporated on top of the display 842 and a touch pad on a surface opposite the display 842.

In some embodiments, the touchscreen 844 is a single-touch touchscreen. In other embodiments, the touchscreen 844 is a multi-touch touchscreen. In some embodiments, the touchscreen 844 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 844. As such, a developer may create gestures that are specific to a particular application program.

In some embodiments, the touchscreen 844 supports a tap gesture in which a user taps the touchscreen 844 once on an item presented on the display 842. The tap gesture may be used for various reasons including, but not limited to, opening or launching whatever the user taps. In some embodiments, the touchscreen 844 supports a double tap gesture in which a user taps the touchscreen 844 twice on an item presented on the display 842. The double tap gesture may be used for various reasons including, but not limited to, zooming in or zooming out in stages. In some embodiments, the touchscreen 844 supports a tap and hold gesture in which a user taps the touchscreen 844 and maintains contact for at least a pre-defined time. The tap and hold gesture may be used for various reasons including, but not limited to, opening a context-specific menu.

In some embodiments, the touchscreen 844 supports a pan gesture in which a user places a finger on the touchscreen 844 and maintains contact with the touchscreen 844 while moving the finger on the touchscreen 844. The pan gesture may be used for various reasons including, but not limited to, moving through screens, images, or menus at a controlled rate. Multiple finger pan gestures are also contemplated. In some embodiments, the touchscreen 844 supports a flick gesture in which a user swipes a finger in the direction the user wants the screen to move. The flick gesture may be used for various reasons including, but not limited to, scrolling horizontally or vertically through menus or pages. In some embodiments, the touchscreen 844 supports a pinch and stretch gesture in which a user makes a pinching motion with two fingers (e.g., thumb and forefinger) on the touchscreen 844 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 844. As such, the above gestures should be understood as being illustrative and should not be construed as being limiting in any way.

The data I/O interface component 846 is configured to facilitate input of data to the computing device and output of data from the computing device. In some embodiments, the data I/O interface component 846 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 848 is configured to provide audio input and/or output capabilities to the computing device. In some embodiments, the audio I/O interface component 846 includes a microphone configured to collect audio signals. In some embodiments, the audio I/O interface component 846 includes a headphone jack configured to provide connectivity for headphones or other external speakers. In some embodiments, the audio interface component 848 includes a speaker for the output of audio signals. In some embodiments, the audio I/O interface component 846 includes an optical audio cable out.

The video I/O interface component 850 is configured to provide video input and/or output capabilities to the computing device. In some embodiments, the video I/O interface component 850 includes a video connector configured to receive video as input from another device (e.g., a video media player such as a DVD or BLURAY player) or send video as output to another device (e.g., a monitor, a television, or some other external display). In some embodiments, the video I/O interface component 850 includes a High-Definition Multimedia Interface ("HDMI"), mini-HDMI, micro-HDMI, DisplayPort, or proprietary connector to input/output video content. In some embodiments, the video I/O interface component 850 or portions thereof is combined with the audio I/O interface component 848 or portions thereof.

The camera 852 can be configured to capture still images and/or video. The camera 852 may utilize a charge coupled device ("CCD") or a complementary metal oxide semiconductor ("CMOS") image sensor to capture images. In some embodiments, the camera 852 includes a flash to aid in taking pictures in low-light environments. Settings for the camera 852 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 854, which can be connected to a battery gauge 856. The batteries 854 may be rechargeable or disposable. Rechargeable battery types include, but are not limited to, lithium polymer, lithium ion, nickel cadmium, and nickel metal hydride. Each of the batteries 854 may be made of one or more cells.

The battery gauge 856 can be configured to measure battery parameters such as current, voltage, and temperature. In some embodiments, the battery gauge 856 is configured to measure the effect of a battery's discharge rate, temperature, age and other factors to predict remaining life within a certain percentage of error. In some embodiments, the battery gauge 856 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component 844.

Based on the foregoing, it should be appreciated that technologies for transforming data to create layouts have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for transforming data to generate a layout, the computer-implemented method comprising performing computer-implemented operations for:
    executing a layout generator at a computing device to obtain the data, the data comprising an image and at least one of text or another element of content;
    analyzing the image, using the layout generator, to identify:
        a salient region of the image, the salient region comprising a subject of the image; and
        an invariant region of the image, at least one of color variation, luminance variation, sharpness variation, blur variation, or pattern variation of the invariant region being below a threshold to achieve a contrast between the text and the image;
    comparing the data to a plurality of designs;
    selecting a design of the plurality of designs to generate the layout, the design comprising a viewport frame, a salient region placement frame, and a text placement frame, and the selecting being based at least in part on:
        determining that the salient region corresponds to the salient region placement frame; and
        determining that the invariant region corresponds to the text placement frame; and
    generating the layout based at least in part on:
        placing the image such that at least a first portion of the salient region is located in a first position corresponding to the salient region placement frame; and
        placing at least one of the text or other element of content such that at least a second portion of the at least one of the text or other element of content is located in a second position corresponding to the text placement frame.

2. The method of claim 1, wherein determining that the salient region corresponds to the salient region placement frame comprises determining that the image can be moved or cropped such that at least the first portion of the salient region fits within the salient region placement frame.

3. The method of claim 1, wherein selecting the design further comprises:
    determining a score representative of a degree to which each design of the plurality of designs relates to the data;
    ranking, based at least in part on the score, the plurality of designs; and
    determining that the design is a highest ranked design of the plurality of designs.

4. The method of claim 1, wherein the viewport frame defines viewable limits of the layout.

5. The method of claim 1, wherein analyzing the image to identify the salient region is based at least in part on analyzing color differences at or within the salient region.

6. The method of claim 1, wherein analyzing the image to identify of the salient region is based at least in part on performing facial recognition processing on the image.

7. The method of claim 1, wherein analyzing the image to identify the salient region is based at least in part on analyzing blurring or sharpness at or within the salient region.

8. The method of claim 1, further comprising, prior to determining that the salient region corresponds to the salient region placement frame, performing at least one manipulation to the image.

9. The method of claim 8, wherein the at least one manipulation comprises zooming, panning, scrolling, cropping, extending, infilling, or seam carving of the image.

10. A computer storage medium having computer readable instructions stored thereupon that, when executed by a computer, cause the computer to:
    execute a layout generator to obtain data comprising visual content and text;
    analyze the image to identify:
        a salient region of the image, the salient region comprising a subject of the image; and
        an invariant region of the image, at least one of color variation, luminance variation, sharpness variation, blur variation, or pattern variation of the invariant region being below a threshold to achieve a contrast between the text and the image;
    compare the data to a plurality of designs to provide a comparison of the data;
    select, based at least partially upon the comparison of the data, a design of the plurality of designs, the design defining a layout and including a viewport frame, a salient region placement frame, and a text placement frame;
    adjust a position of the image relative to the viewport frame to locate the salient region at a first location within the layout corresponding to the salient region placement frame;
    overlay the text at a location within the layout that corresponds to a second location of the text placement frame within the design; and
    generate the layout, the layout comprising at least a first portion of the image and at least a second portion of the text.

11. The computer storage medium of claim 10, wherein the computer executable instructions further cause the computer to:
    compare the salient region to first locations respectively corresponding to salient region placement frames in individual designs of the plurality of designs;
    compare the invariant region to second locations respectively corresponding to text placement frames in the individual designs of the plurality of designs;
    determine that the first location matches the salient region;
    determine that the second location overlaps the invariant region; and select the design based at least in part on determining that the first location matches the salient region and that the second location overlaps the invariant region.

12. The computer storage medium of claim 10, wherein the computer executable instructions further cause the computer to:
prior to selecting the design, resize the image to generate a scaled version of the image; and
select the design based at least in part on the scaled version of the image causing the salient region to correspond to the salient region placement frame and the invariant region to correspond to the text placement frame.

13. The computer storage medium of claim 10, wherein analyzing the image to identify the salient region is based at least in part on analyzing color distributions at or within the salient region.

14. The computer storage medium of claim 10, wherein analyzing the image to identify the salient region is based at least in part on performing object recognition.

15. The method of claim 10, wherein the invariant region excludes the salient region.

16. An apparatus comprising:
a processor;
a memory communicatively coupled to the processor; and
an application program which executes in the processor from the memory and which, when executed by the processor, causes the processor to:
execute a layout generator to obtain data comprising visual content and text;
analyze the image to identify a salient region of the image and an invariant region of the image, the salient region comprising a subject of the image and the invariant portion comprising a first portion of the image at which at least one of color variation, luminance variation, sharpness variation, blur variation, or pattern variation is below a threshold;
compare the data to a plurality of designs to provide a comparison of the data;
select, based at least partially upon the comparison of the data, a design defining a layout, the design comprising a viewport frame defining visible limits of the layout, a salient region placement frame corresponding to a first location at which the salient region of the image is to be placed, and a text placement frame corresponding to a second location at which the text is to be placed within the layout;
load the data into the design based, at least partially, upon the salient region, the invariant region, the salient region placement frame, and the text placement frame; and
generate the layout, the layout comprising at least the subject of the image and the text.

17. The apparatus of claim 16, wherein the application program further causes the processor to:
based at least in part on comparing the data to the plurality of designs, determine a score for each design of the plurality of designs, the score representative of a degree to which each design of relates to the data;
rank, based at least in part on the score, the plurality of designs; and
determine that the design is a highest ranked design of the plurality of designs.

18. The apparatus of claim 16, wherein analyzing the image to identify the salient region of the image is based at least in part on performing facial recognition.

19. The apparatus of claim 16, wherein analyzing the image to identify the salient region of the image is based at least in part on analyzing brightness data at or within the salient region.

20. The apparatus of claim 16, wherein the application program further causes the processor to determine, based at least in part the comparison of the data, that the design matches the data based at least in part on:
determining that at least a second portion of the salient region fits within the salient region placement frame; and
determining that at least a third portion of the invariant portion fits within the text placement frame.

* * * * *